(12) United States Patent
Chin

(10) Patent No.: US 11,994,727 B2
(45) Date of Patent: *May 28, 2024

(54) LIGHT-EMITTING CABLE STRUCTURE

(71) Applicant: ENERGY FULL ELECTRONICS CO., LTD., New Taipei (TW)

(72) Inventor: Hsu-Shen Chin, New Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 18/139,978

(22) Filed: Apr. 27, 2023

(65) Prior Publication Data

US 2024/0077689 A1   Mar. 7, 2024

Related U.S. Application Data

(63) Continuation of application No. 17/180,797, filed on Feb. 21, 2021, now Pat. No. 11,675,150.

(30) Foreign Application Priority Data

Jan. 18, 2021   (TW) ................. 110200612

(51) Int. Cl.
*G02B 6/44*    (2006.01)
*G02B 6/42*    (2006.01)
*F21V 8/00*    (2006.01)

(52) U.S. Cl.
CPC ......... *G02B 6/4416* (2013.01); *G02B 6/4249* (2013.01); *G02B 6/426* (2013.01); *G02B 6/4277* (2013.01); *G02B 6/428* (2013.01); *G02B 6/001* (2013.01)

(58) Field of Classification Search
CPC .... G02B 6/428; G02B 6/4214; G02B 6/4284; G02B 6/43; G02B 6/4292; G02B 6/4249; G02B 6/4416; G02B 6/426; G02B 6/4277
See application file for complete search history.

(56) References Cited

U.S. PATENT DOCUMENTS

| | | | | |
|---|---|---|---|---|
| 9,810,866 | B2 * | 11/2017 | Shimakura | G02B 6/4284 |
| 10,379,307 | B2 * | 8/2019 | Sasaki | G02B 6/3817 |
| 10,884,207 | B2 * | 1/2021 | Nagasaki | G02B 6/4471 |
| 2006/0147161 | A1 * | 7/2006 | Kim | G02B 6/0006 |
| | | | | 385/89 |
| 2011/0293227 | A1 * | 12/2011 | Wu | G02B 6/3817 |
| | | | | 385/101 |
| 2018/0164516 | A1 * | 6/2018 | Lee | G02B 6/4246 |

FOREIGN PATENT DOCUMENTS

| | | | | |
|---|---|---|---|---|
| CN | 203850046 U | * | 9/2014 | |
| EP | 3163342 A1 | * | 5/2017 | ......... G02B 6/4201 |
| WO | WO-2005106899 A1 | * | 11/2005 | ............ G02B 6/001 |
| WO | WO-2014063555 A1 | * | 5/2014 | .............. G02B 6/44 |
| WO | WO-2019228274 A1 | * | 12/2019 | ............ H01B 11/00 |

* cited by examiner

*Primary Examiner* — Michelle R Connelly

(57) ABSTRACT

A light-emitting cable structure includes a light-emitting cable, a first circuit board, second circuit board, at least one light-emitting module and a covering casing. By placing a plurality of signal groups in the light-emitting cable below a plurality of optical fibers in the light-emitting cable for a certain distance and placing the signal groups outside the vertical projection of the optical fibers towards the signal groups, the light in the optical fibers is allowed to be emitted by the vertical projection, so that users can observe the light transmitted in the optical fibers from all sides of the light-emitting cable structure, which greatly increases the attractiveness of the product to consumers.

15 Claims, 26 Drawing Sheets

LIGHT-EMITTING CABLE STRUCTURE

CROSS REFERENCE TO RELATED APPLICATIONS

This application is a continuation application of U.S. Ser. No. 17/180,797, filed on Feb. 21, 2021, which claims the priority of Taiwanese Patent Application No. 110200612, entitled "LIGHT-EMITTING CABLE STRUCTURE", filed on Jan. 18, 2021. The entire disclosures of each of the above applications are incorporated herein by reference.

BACKGROUND

Field of the Invention

The present disclosure relates to a cable structure, and more particularly, to a light-emitting cable structure.

Description of the Prior Art

In order to increase the attractiveness of the product s to consumers, cables with electronic signal transmission functions not only need to have basic signal transmission functions, but also need to increase the attractiveness of the product to consumers by generating different visual effects. Hence, traditional cables can no longer satisfy the consumers. Therefore, it is necessary to provide an innovative light-emitting cable structure to emit light during the signal transmission process to improve the visual effect and increase the attractiveness of the product to consumers.

SUMMARY

An objective of the present disclosure is to provide a light-emitting cable structure to emit light during signal transmission to improve the visual effect and increase the attractiveness of the product to consumers.

The present disclosure provides a light-emitting cable structure which comprises a light-emitting cable, a first circuit board, a second circuit board, at least one light-emitting module and a covering casing. The light-emitting cable comprises a plurality of optical fibers, a plurality of signal groups, jacket, a plurality of first terminals and a plurality of second terminals. The optical fibers are spaced from one another and are used to transmit light. The signal groups are arranged under the optical fibers for a certain distance, and each of the signal groups comprises at least one signal cable for transmitting signals. The optical fibers is made of a lightguide material, and the jacket is made of transparent material and is used to cover the optical fibers and the signal groups. Each of the first terminals is arranged at one end of each of the at least one signal cable, and each of the second terminals is arranged at the other end of each of the at least one signal cable. Each of the first terminals and each of the second terminals extend from each of the at least one signal cable. The first circuit board is arranged at one end of the light-emitting cable, and electrically connected to the first terminals of the light-emitting cable. The second circuit board is arranged at the other end of the light-emitting cable, and is electrically connected to the second terminals on the light-emitting cable. The at least one light-emitting module is arranged on the first circuit board or on the second circuit board, and at least comprises a plurality of light-emitting elements. The light-emitting elements is arranged to emit light to one end of the optical fibers. The covering casing is arranged to cover the first terminals, the second terminals and the light-emitting elements arranged at both ends of the light-emitting cable. The signal groups are arranged outside a vertical projection of the optical fibers towards the signal groups, and light in the optical fibers is able to be emitted by the vertical projection.

According to an embodiment of the present disclosure, each of the signal groups further comprises a metal shielding layer covering the signal group, the metal shielding layer is used to avoid neighboring signal groups interfering each other when transmitting signals, and the metal shielding layer is an Aluminum foil.

According to an embodiment of the present disclosure, the jacket has an integrated structure.

According to an embodiment of the present disclosure, the jacket further comprises a plurality of containment chambers, the containment chambers are spaced from one another, and the optical fibers are arranged in the containment chambers in a one-to-one manner.

According to an embodiment of the present disclosure, the jacket further comprises a plurality of containment slots, the containment slots are spaced from one another, and the optical fibers are arranged in the containment chambers in a one-to-one manner.

According to an embodiment of the present disclosure, the first circuit board comprises a plurality of first external connection parts located on a first side and a plurality of first terminals welding parts located on a second side opposite to the first side, the first terminals are connected to the first terminals welding parts, the second circuit board comprises a plurality of second external connection parts located on the first side a plurality of second terminals welding parts located on the second side, and the second terminals are connected to the second terminals welding parts.

According to an embodiment of the present disclosure, the light-emitting cable structure further comprises a connector which comprises a plurality of first external connection welding pins. The first external connection welding pins are connected to the first external connection parts on the first circuit board.

According to an embodiment of the present disclosure, the first circuit board further comprises a plurality of light-emitting element welding parts located on the first side, each of the light-emitting elements comprises a plurality of light-emitting element welding pins, and the light-emitting element welding pins are connected to the light-emitting element welding parts on the first circuit board.

According to an embodiment of the present disclosure, the second circuit board further comprises plurality of light-emitting element welding parts located on the first side, each of the light-emitting elements comprises a plurality of light-emitting element welding pins, and the light-emitting element welding pins are connected to the light-emitting element welding parts on the second circuit board.

According to an embodiment of the present disclosure, the light-emitting module further comprises an external connection device, the external connection device comprises a plurality of light-emitting element welding parts and an external connection cable, each of the light-emitting elements comprises a plurality of light-emitting element welding pins, the light-emitting element welding pins of the light-emitting elements are connected to the light-emitting element welding parts of the external connection device, and the light-emitting elements emit light according to power control signals received via the external connection cable.

According to an embodiment of the present disclosure, the light-emitting cable structure further comprises at least one supporting plate. The supporting plate is arranged at the light-emitting module and between circuit boards beneath the light-emitting module, and is used to make heights of the light-emitting elements match those of the optical fibers.

According to an embodiment of the present disclosure, the light-emitting cable structure further comprises at least one optical fiber positioning member. The optical fiber positioning member is arranged at the first terminals or the second terminals, and comprises a plurality of alignment apertures. The light-emitting cable further comprises a plurality of protruding optical fibers. Each of the protruding optical fibers is arranged at one end of each of the optical fibers, and is extended from each of the optical fibers. The protruding optical fibers are fastened to the alignment apertures.

According to an embodiment of the present disclosure, the covering casing comprises a first casing member, a second casing member, a third casing member and a fourth casing member. The first casing member is arranged at one side of the first circuit board, the second casing member is arranged on the other side of the first circuit board, the third casing member is arranged on one side of the second circuit board, and the fourth casing member is arranged on the other side of the second circuit board. The first circuit board further comprises a first joint hole, and the first casing member further comprises a first hole and a plurality of first concave parts. The second casing member further comprises a second hole and a plurality of first containing parts, and the first hole and the second hole is aligned with the first joint hole. The first concave parts are arranged corresponding to the optical fibers, the first containing parts are arranged corresponding to the jacket. The second circuit board further comprises a second joint hole, the third casing member further comprises a third hole and a plurality of second concave parts, the fourth casing member further comprises a fourth hole and a plurality of second containing parts. The third hole and the fourth hole is aligned with the second joint hole. The second concave parts are arranged corresponding to the optical fibers, and the second containing parts are arranged corresponding to the jacket. The first circuit board, the first casing member and the second casing member are lock-fixed via a lock-fixing element, and the second circuit board, the third casing member and the fourth casing member are lock-fixed via the lock-fixing element.

According to an embodiment of the present disclosure, the first circuit board and the second circuit board are printed circuit boards (PCB).

The present disclosure has the following beneficial effects: by arranging the signal groups beneath the optical fibers for a certain distance and arranging the signal groups outside the vertical projection of the optical fibers towards the signal groups. The light in the optical fibers is allowed to be emitted by the vertical projection.

In this way, users can observe the light transmitted into the optical fibers from various angles of the light-emitting cable structure, thus greatly increase the attractiveness of the product to consumers. By designing the jacket and the optical fibers into an integrated structure, the process of assembling the light-emitting cable structure the steps of assembling the light-emitting cable structure can be simplified. Further, by designing the jacket into having the containment chambers, users can choose the appropriate optical fibers according to their needs. In other cases, when the lifespan of an optical fiber expires, it can be replaced with a new optical fiber so that the light-emitting cable structure can be used continually, reducing the users' cost of using the light-emitting cable structure. Furthermore, by designing the jacket into having the containment slots, users can choose the appropriate optical fiber according to their needs. In other cases, when the lifespan of an optical fiber expires, it can be replaced with a new optical fiber so that the light-emitting cable structure can be used continually. The use of the containment slots further benefits the users in replacing optical fibers, making the process of replacing optical fibers more convenient. When the light-emitting module comprises a first light-emitting module and a second light-emitting module, by combining the first light-emitting module and the second light-emitting module respectively located at the both ends of the optical fibers (i.e., the first terminal and the second terminal), the optical fibers can receive the light transmitted from both ends at the same time, increasing the brightness of the light in the optical fibers and thereby increasing the attractiveness of the product to consumers.

DETAILED DESCRIPTION OF THE INVENTION

In order to further understand the features, technical means, and specific functions and objectives achieved by the present invention, more specific embodiments are illustrated in detail together with the drawings and figure numbers thereof as follows.

The description of each embodiment below may refer to the attached drawings, which shows that the present disclosure may be used to implement specific embodiments. Directional terms mentioned in the present disclosure, such as "up", "down", "front", "back", "left", "right", "top", "bottom", "horizontal", "vertical," etc., should be jointly referenced with the attached drawings. Those directional terms are used to illustrate and provide better understanding of the present disclosure, rather than restricting the scope of the present disclosure.

Figure 1A:
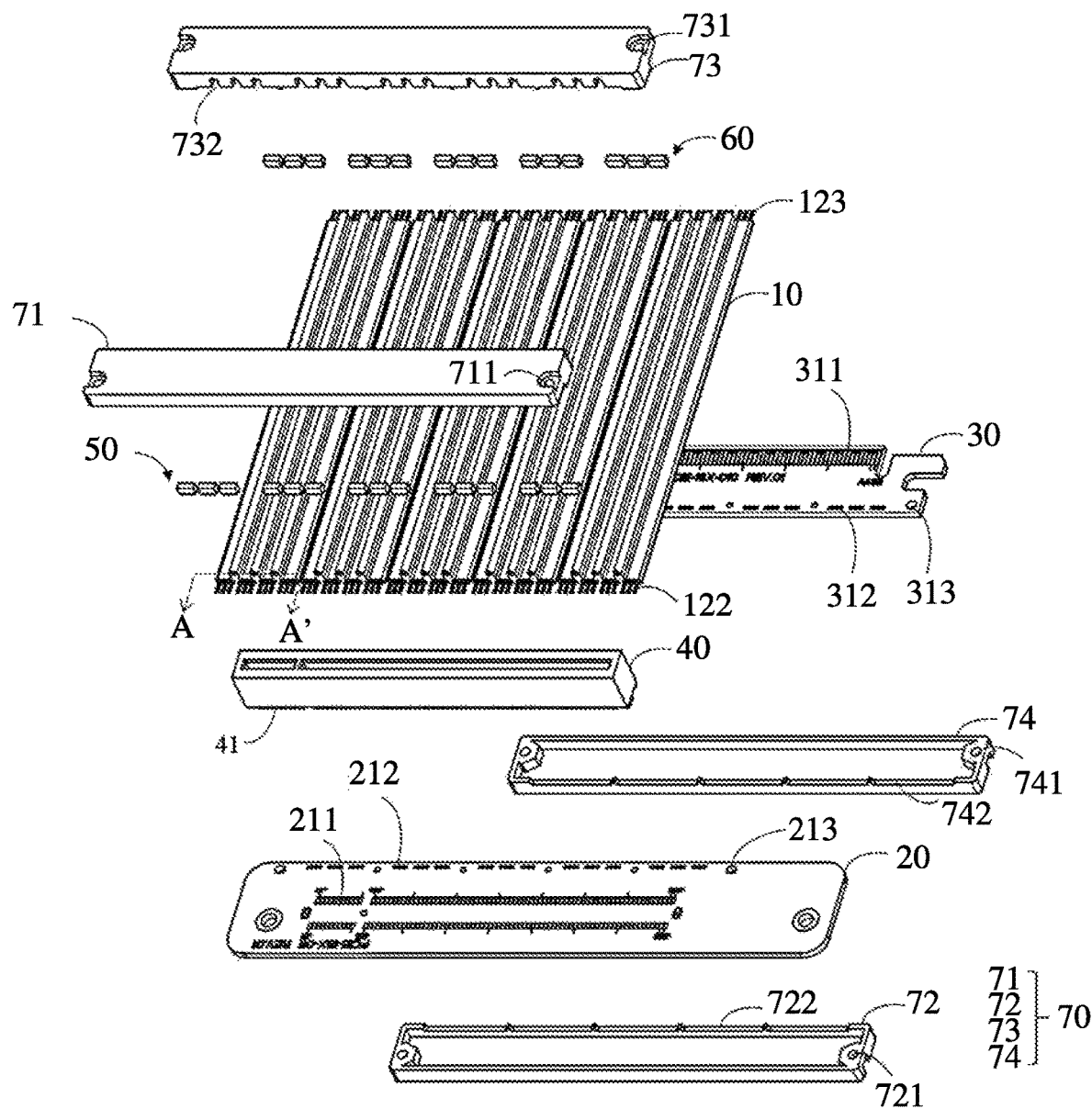
FIG. 1A shows an exploded view of the light-emitting cable structure according to a first embodiment of the present disclosure.
Figure 1B:
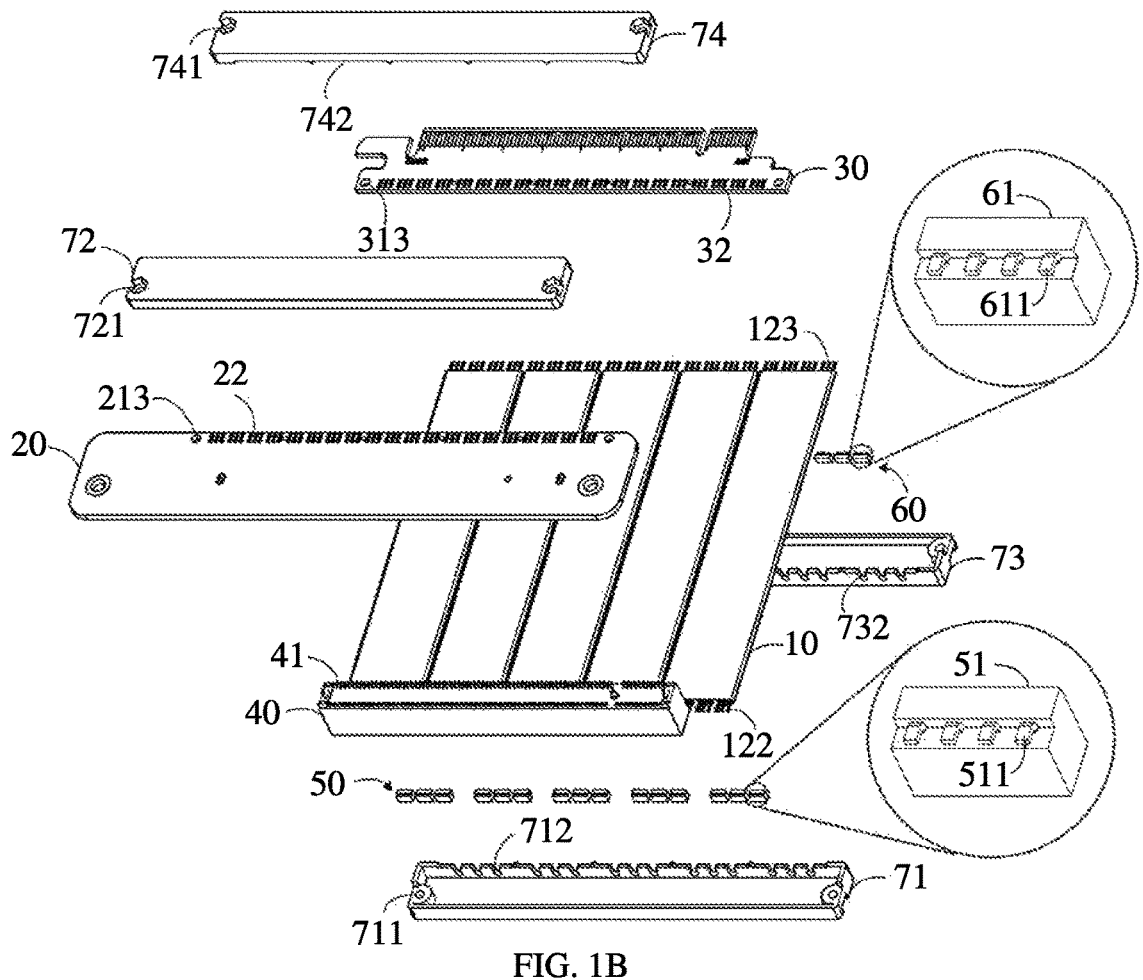
FIG. 1B shows an exploded view of the light-emitting cable structure of FIG. 1A from the opposite perspective.

Please refer to FIG. 1A and FIG. 1B. FIG. 1A shows an exploded view of the light-emitting cable structure according to a first embodiment of the present disclosure, and FIG. 1B shows an exploded view of the light-emitting cable structure of FIG. 1A from the opposite perspective. The light-emitting cable structure comprises a light-emitting cable 10, a first circuit board 20, a second circuit board 30, a connector 40, a first light-emitting module 50, a second light-emitting module 60 and a covering casing 70.

Figure 2:
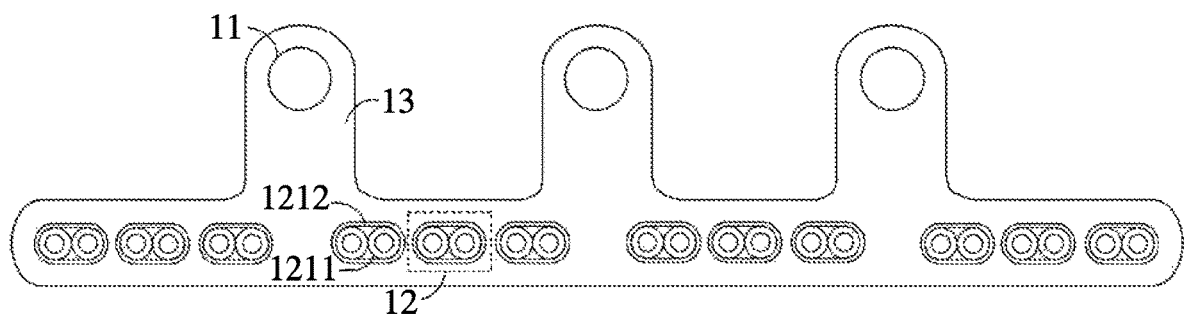
FIG. 2 shows a cross-sectional view of the light-emitting cable along the cutting line A-A' in FIG. 1.

FIG. 2 shows a cross-sectional view of the light-emitting cable along the cutting line A-A' in FIG. 1. As shown in FIG. 1A, FIG. 1B and FIG. 2, the light-emitting cable 10 comprises a plurality of optical fibers 11, a plurality of signal groups 12 and jacket 13. The optical fibers 10 are spaced from one another, and are lightguide elements which uses the principle of total reflection of light to transmit light. The signal groups 12 are arranged below the optical fibers 11 for a certain distance, and each signal group 12 comprises at least one signal cable 1211 for transmitting signals. The optical fibers 11 and the signal groups 12 are covered by the jacket 13, the optical fibers 11 is made of a lightguide material, and the jacket 13 is made of a light-transmissive material. The optical fibers 11 and the jacket 13 is in an integrated structure, and one advantage of this design is the process of installing a plurality of optical fibers can be simplified.

In this embodiment, each signal group 12 further comprises a metal shielding layer 1212 covering the signal cable 1211, and the metal shielding layer 1212 is used to prevent the neighboring signal groups 12 interfering each other when transmitting signals. The metal shielding layer 1212 is preferably made of Aluminum foil.

In this embodiment, the connector 40 comprises a plurality of first external connection welding pins 41. The first light-emitting module 50 is arranged on the first circuit board 20 (at one end of the light-emitting cable 10), and comprises a plurality of first light-emitting elements 51 (e.g. light-emitting diodes). Each first light-emitting element 51 comprises a plurality of first light-emitting element welding pins 511. The second light-emitting module 60 is arranged on the second circuit board 30 (at the other end of the light-emitting cable 10), and comprises a plurality of second light-emitting elements 61 (e.g. light-emitting diodes). Each second light-emitting element 61 comprises a plurality of second light-emitting element welding pins 611. The light-emitting cable 10 further comprises a plurality of first terminals 122 and a plurality of second terminals 123. Each first terminal 122 is arranged at one end of each signal cable 1211, and each of the second terminals 123 is arranged at the other end of each signal cable 1211. Each first terminal 122 and each of the second terminals 123 are extensions of each corresponding signal cable 1211. The first circuit board 20 comprises a plurality of first external connection parts 211 (arranged along the first edge) and a plurality of first light-emitting elements welding parts 212 (arranged along the second edge) on the first side (e.g. the front side), and a plurality of first terminals welding parts 22 (arranged along the second edge) on the second side (e.g. the back side of the first side). The second circuit board 30 comprises a plurality of second external connection parts 311 (arranged along the second edge) and a plurality of second light-emitting elements welding part 312 (arranged at first edge) on the first side, and a plurality of second terminals welding parts 32 (arranged at first edge) on the second side. Note that the first edge may be the lower edge, and the second edge may be an upper edge.

Figure 3A:
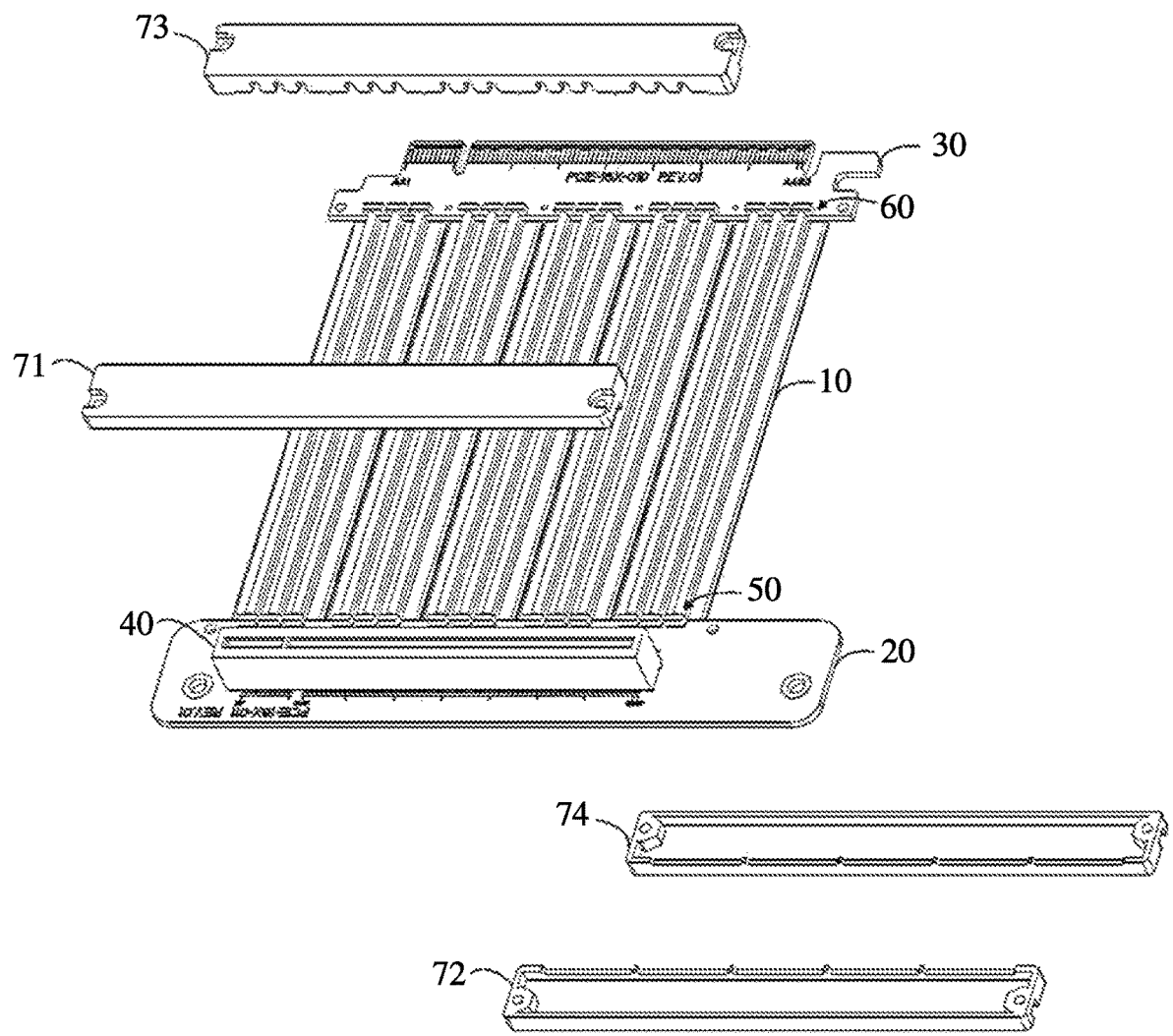
FIG. 3A shows partial assembly of the light-emitting cable structure according to the first embodiment of the present disclosure.
Figure 3B:
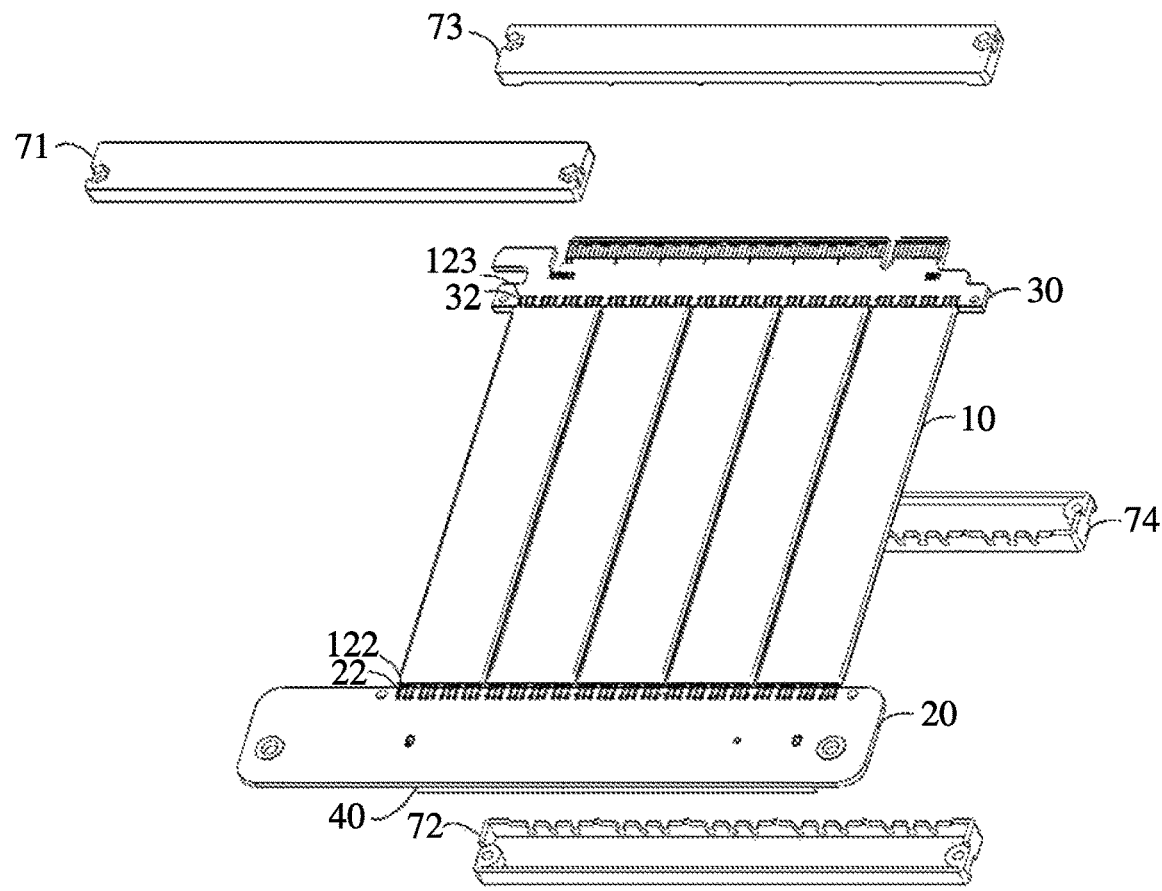
FIG. 3B shows the partial assembly of the light-emitting cable structure of FIG. 3A from the opposite perspective.

Further, the first external connection welding pins 41 on the connector 40 are connected to the first external connection parts 211 on the first circuit board 20. The first light-emitting element welding pins 511 on the first light-emitting module 50 are connected to the first light-emitting element welding parts 212 on the first circuit board 20, to achieve electrical connection between the first light-emitting element 51 and the first circuit board 20. The second light-emitting element welding pins 611 on the second light-emitting module 60 are connected to the second light-emitting element welding part 312 on the second circuit board 30, to achieve the electrical connection between the second light-emitting element 61 and the second circuit board 30. The first terminals 122 on the light-emitting cable 10 are connected to the first terminals welding parts 22 on the first circuit board 20, and the first light-emitting element 51 contacts one end of the optical fibers 11, so that the light emitted from the first light-emitting element 51 can be transmitted to the optical fibers 11. The second terminals 123 on the light-emitting cable 10 are connected to the second terminals welding parts 32 on the second circuit board 30, and the second light-emitting element 61 contacts the other end of the optical fibers 11, so that the light emitted from the second light-emitting element 61 can be transmitted to the optical fibers 11 as shown in FIG. 3A and FIG. 3B.

In other embodiments, the connector 40 is connected with other elements, making the device that comprises the light-emitting cable structure achieve the functionality of the light-emitting cable structure. External electronic elements (not shown in the figure) may be connected to the light-emitting cable structure via the second external connection parts 311 on the second circuit board 30, and the external electronic element may be used to transmit power control signals, so that the first light-emitting module 50 and the second light-emitting module 60 may emit light according to the power control signals.

In the present disclosure, since the optical fibers 11 is made of a lightguide material and the jacket 13 is made of a light-transmissive material, the user may observe the light transmitted in the optical fibers 11, which increase the attractiveness of the product to consumers. In addition, the signal groups 12 are arranged outside the vertical projection of the optical fibers 11, making the vertical projection of the optical fibers 11 a light-transmissive area. In other words, since the signal group 12 is arranged on the light-transmissive area, the light-transmissive area may allow the light in the optical fiber to emit out, so that the user may observe the light emitted transmitted in the optical fibers 11 from various angles, thus greatly increasing the attractiveness of the product to consumers.

Figure 4A:
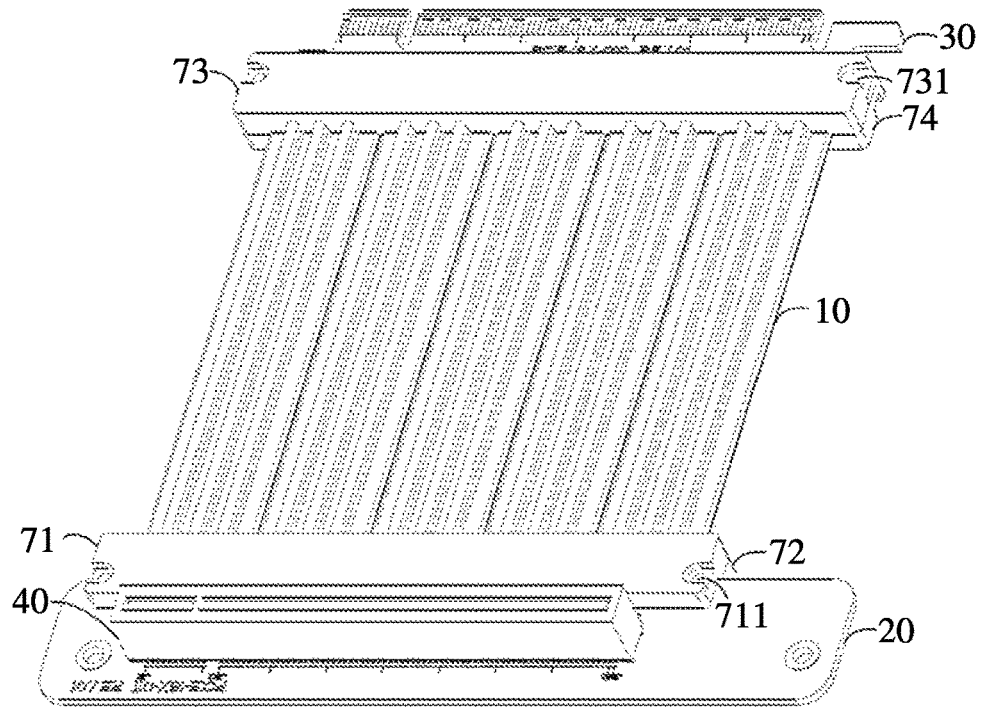
FIG. 4A shows the assembly of the light-emitting cable structure according to the first embodiment of the present disclosure.
Figure 4B:
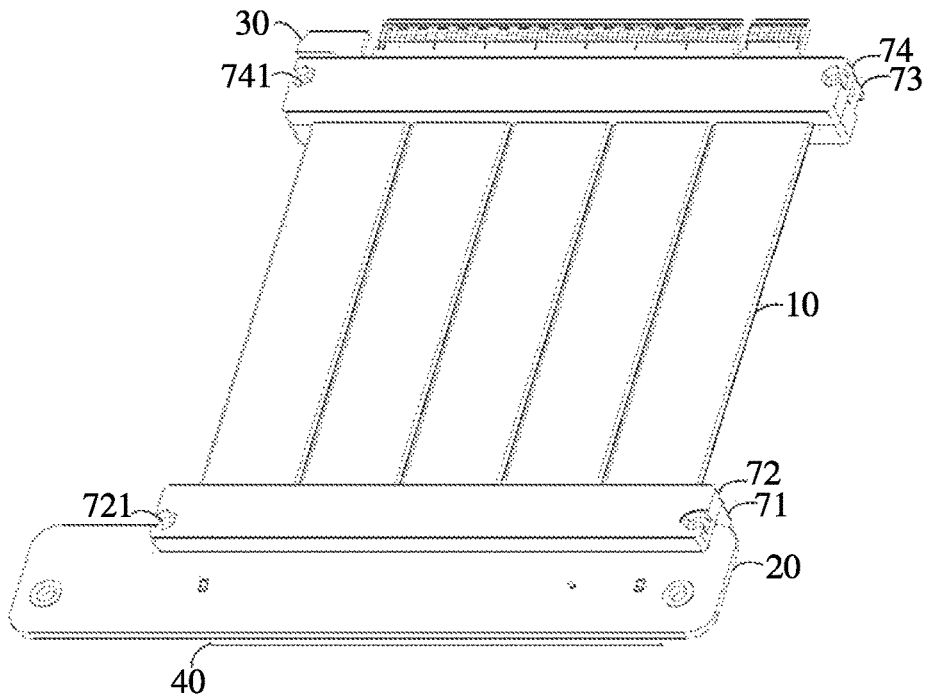
FIG. 4B shows the assembly of the light-emitting cable structure of FIG. 4A from the opposite perspective.

In this embodiment, the covering casing comprises a first casing member 71, a second casing member 72, a third casing member 73 and a fourth casing member 74. The first casing member 71 is arranged on one side of the first circuit board 20, the second casing member 72 is arranged on the other side of the first circuit board 20, the third casing member 73 is arranged on one side of the second circuit board 30, and the fourth casing member 74 is arranged on the other side of the second circuit board 30. The first circuit board 20 further comprises a first joint hole 213, and the first casing member 71 further comprises a first hole 711 and a plurality of first concave parts 712. The second casing member 72 further comprises a second hole 721 and a plurality of first containing parts 722. The first hole 711 and the second hole 721 are aligned with the first joint hole 213 on the first circuit board 20. The first concave parts 712 is arranged corresponding to the optical fibers 11, and the first containing parts 722 are arranged corresponding to the jacket 13. Lock-fixing elements (e.g. screws and screw caps) may be used to pass through the first hole 711, the second hole 721 and the first joint hole 213 on the first circuit board 20, so as to lock the first circuit board 20, the first casing member 71 and the second casing member 72. The second circuit board 30 further comprises a second joint hole 313, the third casing member 73 further comprises a third hole 731 and a plurality of second concave parts 732, and the fourth casing member 74 further comprises a fourth hole 741 and a plurality of second containing parts 742. The third hole 731 and the fourth hole 741 and the second circuit board 30 are aligned with the second joint hole 313. The second concave parts 732 are arranged corresponding to the optical fibers 11, and the second containing parts 742 may be arranged corresponding to the jacket 13. Lock-fixing elements (e.g. screws and screw caps) may be used to pass through the third hole 731, the fourth hole 741 and the second joint hole 313 on the second circuit board 30, in order to lock the second circuit board 30, the third casing member 73 and the fourth casing member 74. As show in FIG. 4A and FIG. 4B, with the arrangement of the first casing member 71, the second casing member 72, the third casing member 73 and the fourth casing member 74, the first terminals 122, the second terminals 123, the first light-emitting element 51 and the second light-emitting element 61 arranged at both ends of the light-emitting cable 10 may be covered and protected, thus preventing the light-emitting cable structure from damages from the external environment.

Figure 5A:
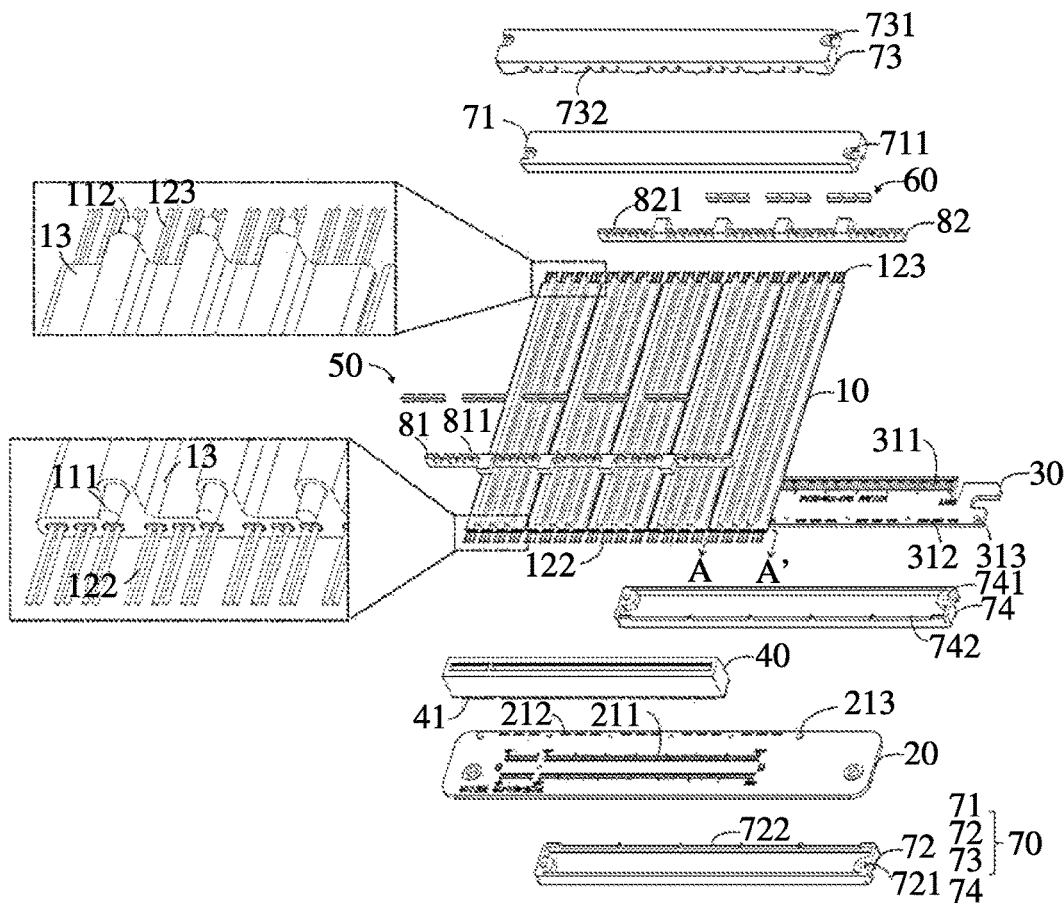
FIG. 5A shows an exploded view of the light-emitting cable structure according to a second embodiment of the present disclosure.
Figure 5B:
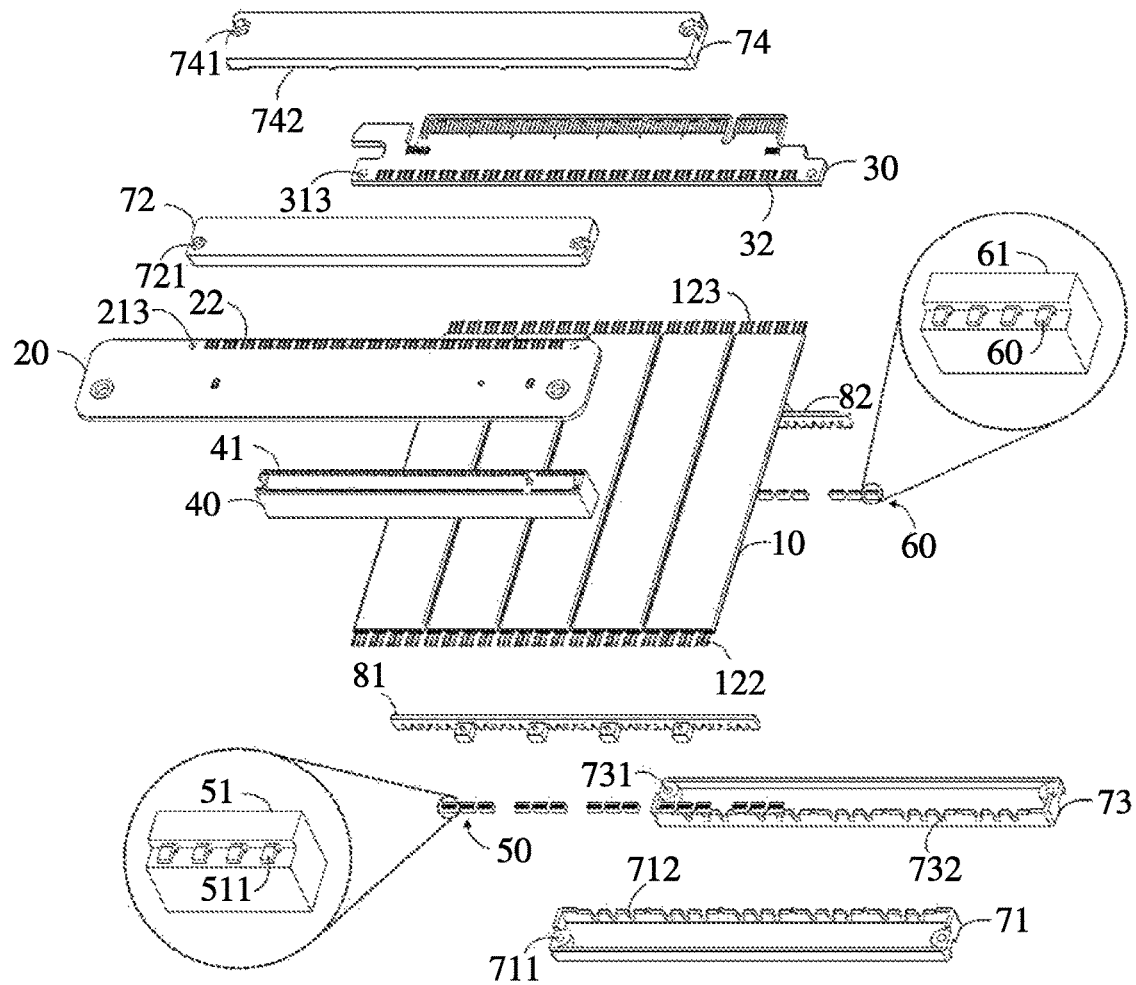
FIG. 5B shows an exploded view of the light-emitting cable structure of FIG. 5A from the opposite perspective.

Please refer to FIG. 5A and FIG. 5B. FIG. 5A shows an exploded view of the light-emitting cable structure according to a second embodiment of the present disclosure, and FIG. 5B shows an exploded view of the light-emitting cable structure of FIG. 5A from the opposite perspective. The light-emitting cable structure comprises a light-emitting cable 10, a first circuit board 20, a second circuit board 30, a connector 40, a first light-emitting module 50, a second light-emitting module 60, a covering casing 70, a first optical fiber positioning member 81 and a second optical fiber positioning member 82.

Figure 6:
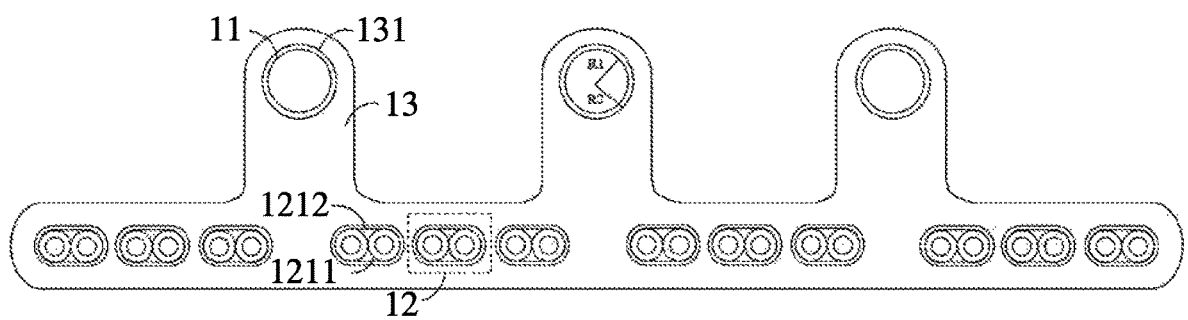
FIG. 6 shows a cross-sectional view of the light-emitting cable along the cutting line A-A' in FIG. 5A.

FIG. 6 shows a cross-sectional view of the light-emitting cable along the cutting line A-A' in FIG. 5A. As shown in FIG. 5A, FIG. 5B and FIG. 6, the light-emitting cable 10 comprises a plurality of optical fibers 11, a plurality of signal groups 12 and a jacket 13. The jacket 13 comprises a plurality of containment chambers 131, which are spaced from one another. The optical fibers 11 is arranged at the containment chambers 131 in a one-to-one manner. The optical fibers 11 are lightguide elements, utilizing the principle of total reflection of light to transmit light. The signal groups 12 is arranged beneath the optical fibers 11 (or arranged beneath the containment chambers 131) for a certain distance, each signal group 12 comprises at least one signal cable 1211 for transmitting signals. The optical fibers 11 and the signal groups 12 are covered by the jacket 13. The optical fibers 11 is made of lightguide, and the jacket 13 is made of a light-transmissive material. One advantage to include the light-emitting cable 10 of the containment chambers 131 is that the user may select suitable optical fibers according to actual needs, or when the optical fibers are worn out due to the life expectancy is up, it only requires replacing new optical fibers to continue using the light-emitting cable structure, thus reducing the cost on the light-emitting cable structure for users.

Figure 7:
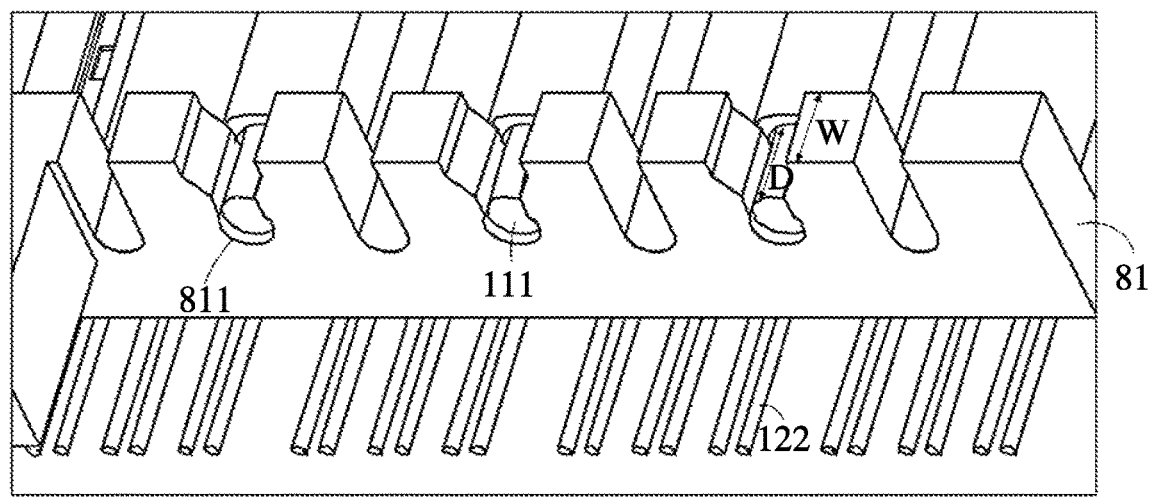
FIG. 7 shows a plurality of first protruding optical fibers being fastened to a first optical fiber positioning member according to the second embodiment of the present disclosure.

In this embodiment, each signal group 12 further comprises a metal shielding layer 1212 covering the signal cable 1211. The metal shielding layer 1212 is used to prevent the neighboring signal group 12 from interfering each other when transmitting signals, wherein the metal shielding layer 1212 is preferably made of Aluminum foil. FIG. 7 shows a plurality of first protruding optical fibers 111 being fastened to a first optical fiber positioning member 81 according to the second embodiment of the present disclosure. As shown in FIG. 5A, FIG. 5B and FIG. 7, the light-emitting cable further comprises a plurality of first protruding optical fibers 111 and a plurality of second protruding optical fibers 112. Each first protruding optical fiber 111 is arranged at one end of each optical fiber 11, and each second protruding optical fiber 112 is arranged at the other end of each optical fiber 11. Each first protruding optical fiber 111 and each second protruding optical fiber 112 are extensions of each corresponding optical fiber 11, and both of the first protruding optical fibers 111 and the second protruding optical fiber 112 have the length D. The first optical fiber positioning member 81 and the second optical fiber positioning member 82 are extended along the optical fibers 11 and has the width W. The length D is not smaller than the width W, and the length D is preferably equal to the width W. Further, each optical fiber 11 has the first radius R1, and each containment chamber 131 has the second radius R2, wherein the second radius R2 is not smaller than the first radius R1. Since the second radius R2 is not smaller than the first radius R1, there is certain space for the optical fibers 11 to adjust the position. In addition, the first optical fiber positioning member 81 comprises a plurality of first alignment apertures 811, and the second optical fiber positioning member 82 comprises a plurality of second alignment apertures 821. The first protruding optical fibers 111 is fastened to the first alignment aperture 811 (as shown in FIG. 7), and the second protruding optical fiber 112 is fastened to the second alignment aperture 821.

The connector 40 comprises a plurality of first external connection welding pins 41. The first light-emitting module 50 is arranged on the first circuit board 20 (at one end of the light-emitting cable 10), and comprises a plurality of first light-emitting elements 51 (e.g. light-emitting diodes). Each first light-emitting element 51 comprises a plurality of first light-emitting element welding pins 511. The second light-emitting module 60 is arranged on the second circuit board 30 (at the other end of the light-emitting cable 10), and comprises a plurality of second light-emitting elements 61 (e.g. light-emitting diodes). Each second light-emitting element 61 comprises a plurality of second light-emitting element welding pins 611. The light-emitting cable 10 further comprises a plurality of first terminals 122 and a plurality of second terminals 123, each first terminal 122 is arranged at one end of each signal cable 1211, and each second terminals 123 is arranged at the other end of each signal cable 1211. Each first terminal 122 and each of the second terminals 123 are extensions of each corresponding signal cable 1211. The first circuit board 20 comprises: a plurality of first external connection parts 211 (arranged at first edge) and a plurality of first light-emitting elements welding parts 212 (arranged along the second edge) on first side (e.g. the front side), and a plurality of first terminals welding parts 22 (arranged along the second edge) on the second side (e.g. the back side of the first side). The second circuit board 30 comprises: a plurality of second external connection parts 311 (arranged along the second edge) and a plurality of second light-emitting elements welding part 312 (arranged at first edge) on the first side, and a plurality of second terminals welding parts 32 (arranged at first edge) on the second side. The first optical fiber positioning member 81 is arranged at the first terminals 122, and the second optical fiber positioning member 82 is arranged at the second terminals 123. Note that the first edge may be the lower edge, and the second edge may be the upper edge.

Figure 8A:
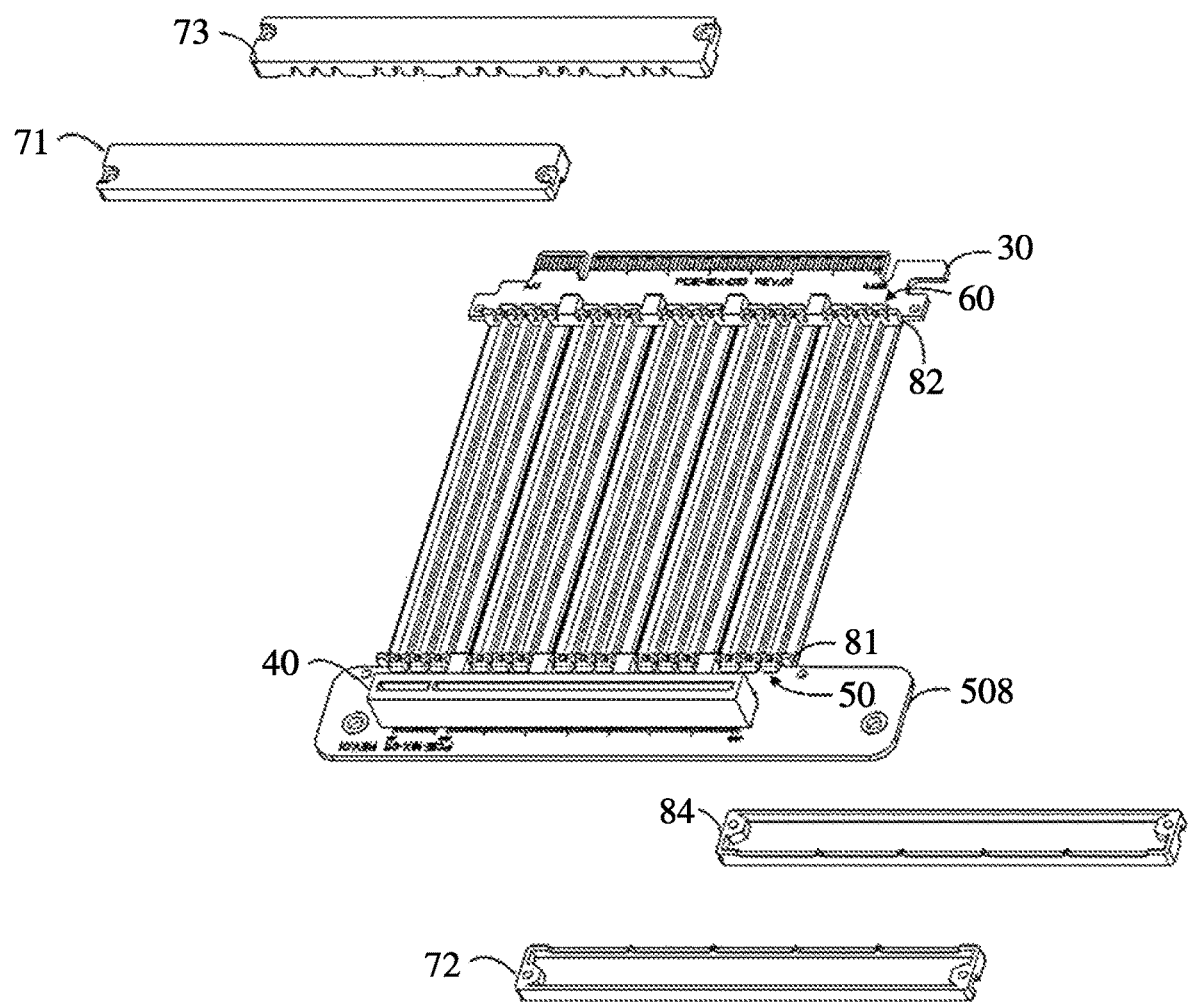
FIG. 8A shows partial assembly of the light-emitting cable structure according to the second embodiment of the present disclosure.
Figure 8B:
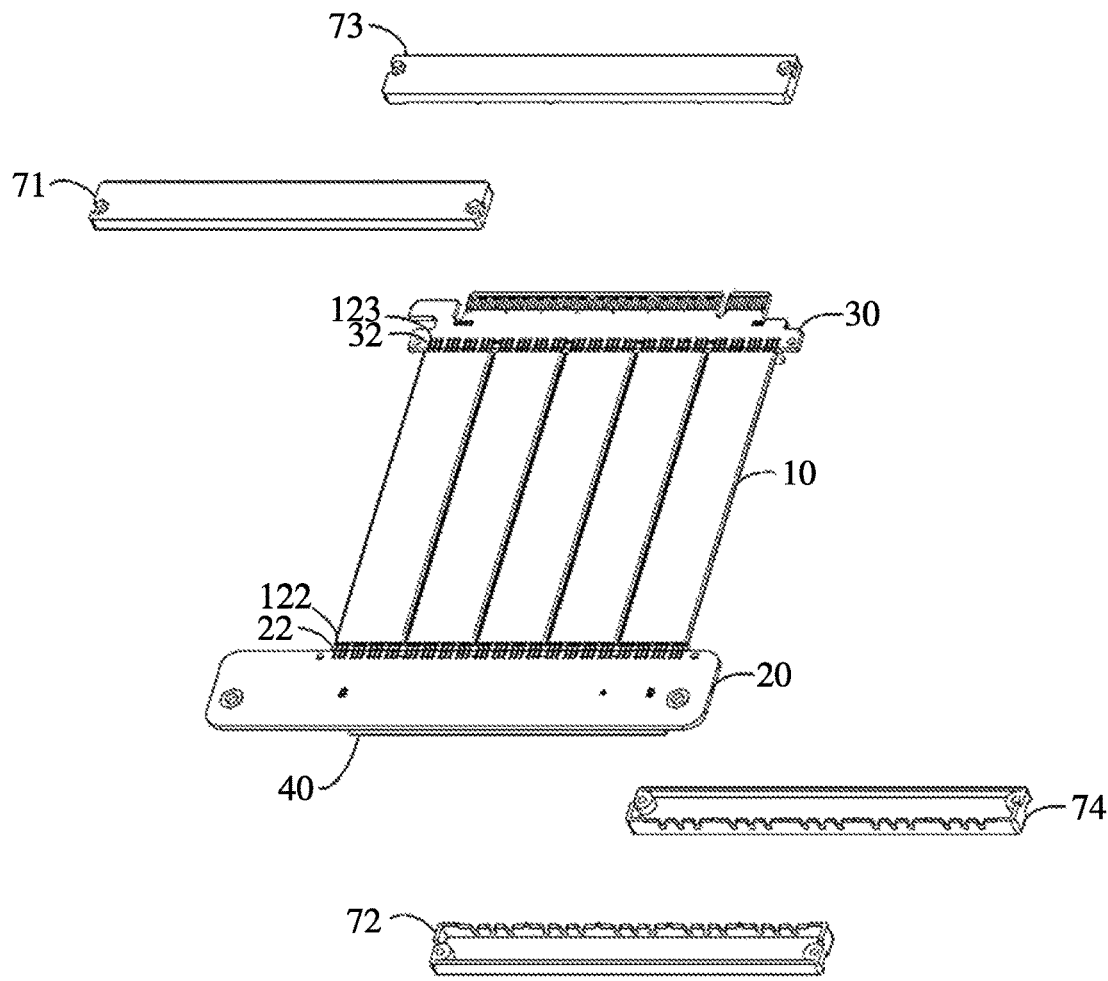
FIG. 8B shows the partial assembly of the light-emitting cable structure of FIG. 8A from the opposite perspective.

Further, the first external connection welding pins 41 on the connector 40 are connected to the first external connection parts 211 on the first circuit board 20. The first light-emitting element welding pins 511 on the first light-emitting module 50 are connected to the first light-emitting element welding parts 212 on the first circuit board 20, to achieve the electrical connection between the first light-emitting element 51 and the first circuit board 20. The second light-emitting element welding pins 611 on the second light-emitting module 60 are connected to the second light-emitting element welding part 312 on the second circuit board 30, to achieve the electrical connection between the second light-emitting element 61 and the second circuit board 30. The first terminals 122 on the light-emitting cable 10 are connected to the first terminals welding parts 22 on the first circuit board 20, and the first light-emitting element 51 contacts one end of the optical fibers 11, so that the light emitted by the first light-emitting element 51 can be transmitted to the optical fibers 11. The second terminals 123 on the light-emitting cable 10 are connected to the second terminals welding parts 32 on the second circuit board 30, and the second light-emitting element 61 contacts the other end of the optical fibers 11, so that the light emitted by the second light-emitting element 61 can be transmitted to the optical fibers 11, as shown in FIG. 8A and FIG. 8B.

In other embodiments, the connector 40 is connected with other elements, making the device that comprises the light-emitting cable structure achieve the functionality of the light-emitting cable structure. Further, external electronic elements (not shown in the figure) may be connected to and the light-emitting cable structure via the second external connection parts 311 on the second circuit board 30. The external electronic element may be used to transmit power control signals, so that the first light-emitting module 50 and the second light-emitting module 60 may emit light according to the power control signals.

In the present disclosure, since the optical fibers 11 is made of a lightguide material and the jacket 13 is made of a light-transmissive material, the user may observe the light transmitted in the optical fibers 11, thus increasing the attractiveness of the product to consumers. In addition, the signal groups 12 are arranged outside the vertical projection of the optical fibers 11, making the vertical projection of the optical fibers 11 a light-transmissive area. In other words, since the signal group 12 is arranged on the light-transmissive area, the light-transmissive area may allow the light in the optical fiber to emit out, so that the user may observe the light emitted transmitted in the optical fibers 11 from various angles, thus greatly increasing the attractiveness of the product to consumers.

Figure 9A:
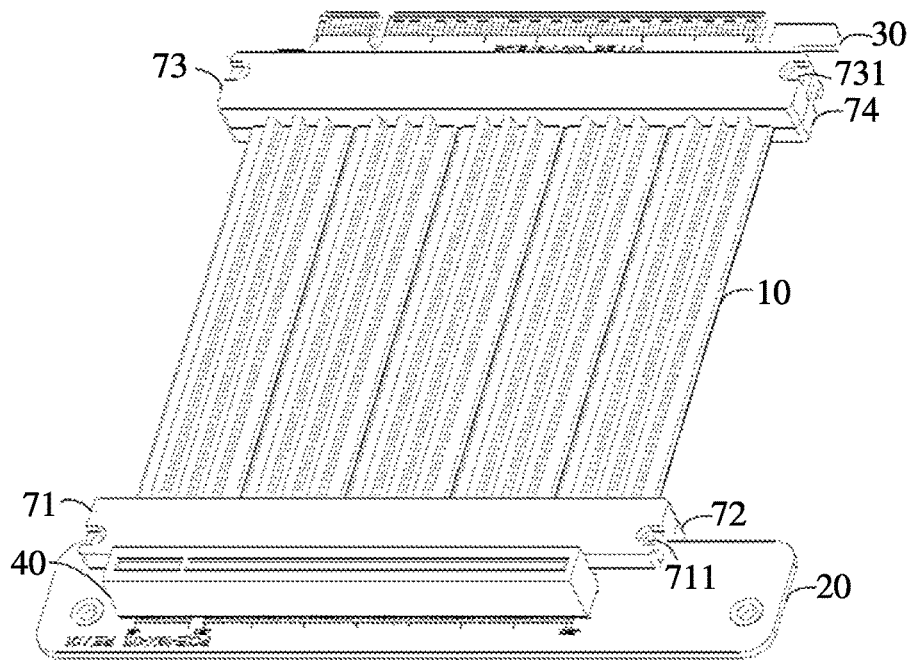
FIG. 9A shows the assembly of the light-emitting cable structure according to the second embodiment of the present disclosure.
Figure 9B:
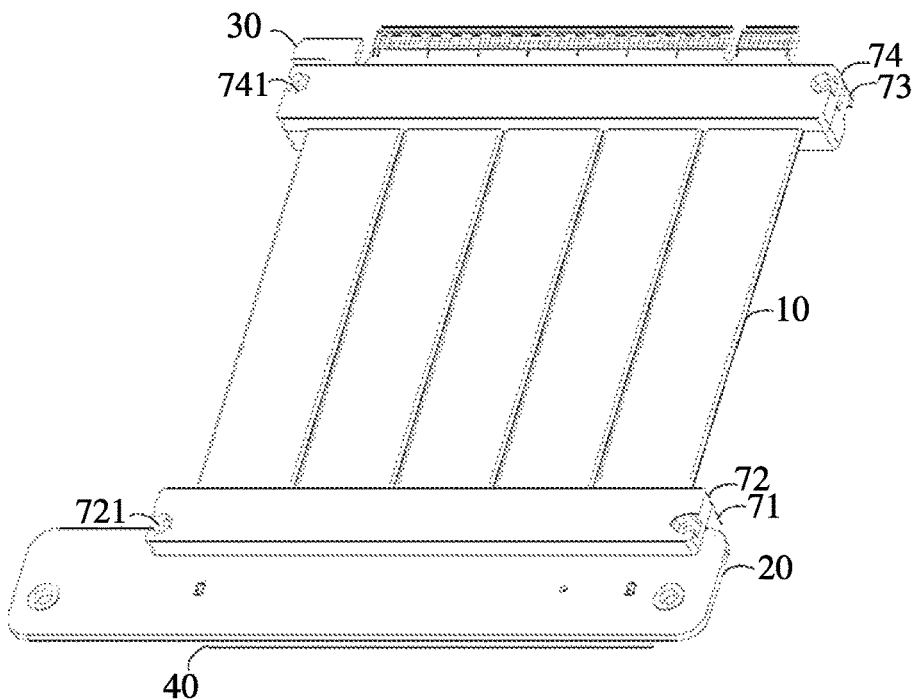
FIG. 9B shows the assembly of the light-emitting cable structure of FIG. 9A from the opposite perspective.

In this embodiment, the covering casing comprises a first casing member 71, a second casing member 72, a third casing member 73 and a fourth casing member 74. The first casing member 71 is arranged on one side of the first circuit board 20, the second casing member 72 is arranged on the other side of the first circuit board 20, the third casing member 73 is arranged on one side of the second circuit board 30, and the fourth casing member 74 is arranged on the other side of the second circuit board 30. The first circuit board 20 further comprises a first joint hole 213, and the first casing member 71 further comprises a first hole 711 and a plurality of first concave parts 712. The second casing member 72 further comprises a second hole 721 and a plurality of first containing parts 722, and the first hole 711 and the second hole 721 are aligned with the first joint hole 213 on the first circuit board 20. The first concave parts 712 is arranged corresponding to the optical fibers 11, and the first containing parts 722 is arranged corresponding to the jacket 13. Lock-fixing elements (e.g. screws and screw caps) may be used to pass through the first hole 711, the second hole 721 and the first joint hole 213 on the first circuit board 20, in order to fasten the first circuit board 20, the first casing member 71 and the second casing member 72. The second circuit board 30 further comprises a second joint hole 313, the third casing member 73 further comprises a third hole 731 and a plurality of second concave parts 732, and the fourth casing member 74 further comprises a fourth hole 741 and a plurality of second containing parts 742. The third hole 731 and the fourth hole 741 are aligned with the second joint hole 313 on the second circuit board 30. The second concave parts 732 may be arranged corresponding to the optical fibers 11, and the second containing parts 742 may be arranged corresponding to the jacket 13. Lock-fixing elements (e.g. screws and screw caps) may be used to pass through the third hole 731, the fourth hole 741 and the second joint hole 313 on the second circuit board 30, in order to lock the second circuit board 30, the third casing member 73 and the fourth casing member 74. As shown in FIG. 9A and FIG. 9B, with the arrangement of the first casing member 71, the second casing member 72, the third casing member 73 and the fourth casing member 74, the first terminals 122, the second terminals 123, the first light-emitting element 51 and the second light-emitting element 61 arranged at both ends of the light-emitting cable 10 can be covered and protected, thus preventing the light-emitting cable structure from being damaged by the external environment.

Figure 10A:
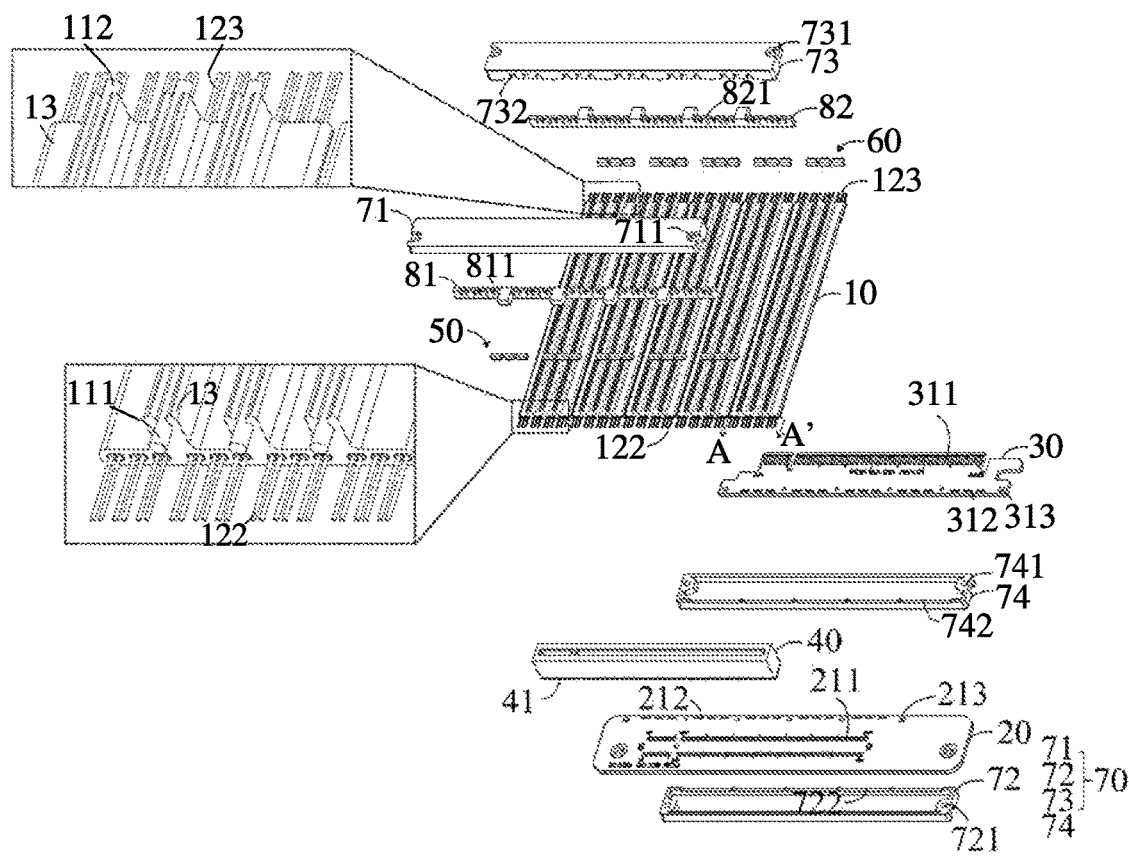
FIG. 10A shows an exploded view of the light-emitting cable structure according to a third embodiment of the present disclosure.
Figure 10B:
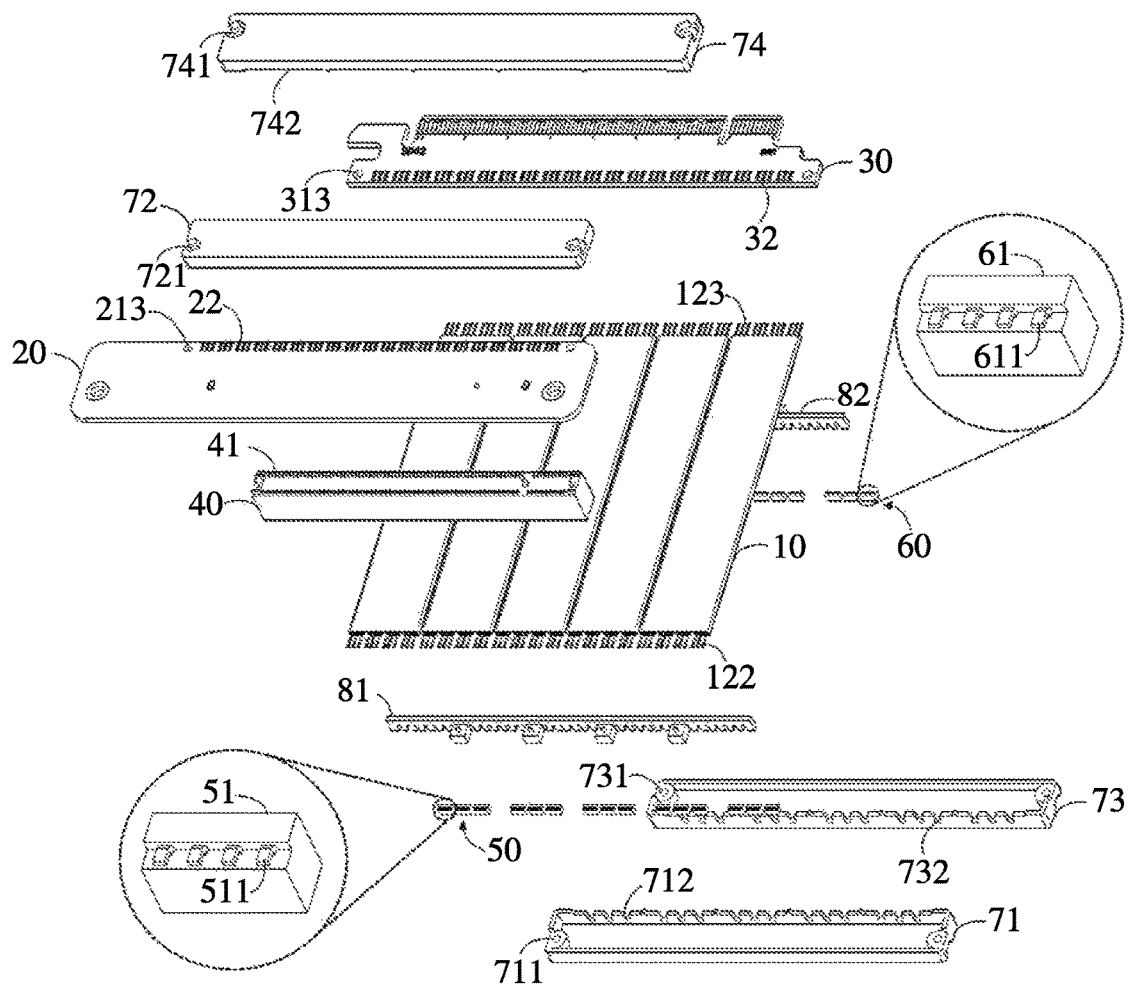
FIG. 10B shows an exploded view of the light-emitting cable structure of FIG. 10A from the opposite perspective.

Please refer to FIG. 10A and FIG. 10B. FIG. 10A shows an exploded view of the light-emitting cable structure according to a third embodiment of the present disclosure, and FIG. 10B shows an exploded view of the light-emitting cable structure of FIG. 10A from the opposite perspective. The light-emitting cable structure comprises a light-emitting cable 10, a first circuit board 20, a second circuit board 30, a connector 40, a first light-emitting module 50, a second light-emitting module 60, a covering casing 70, a first optical fiber positioning member 81 and a second optical fiber positioning member 82.

Figure 11:
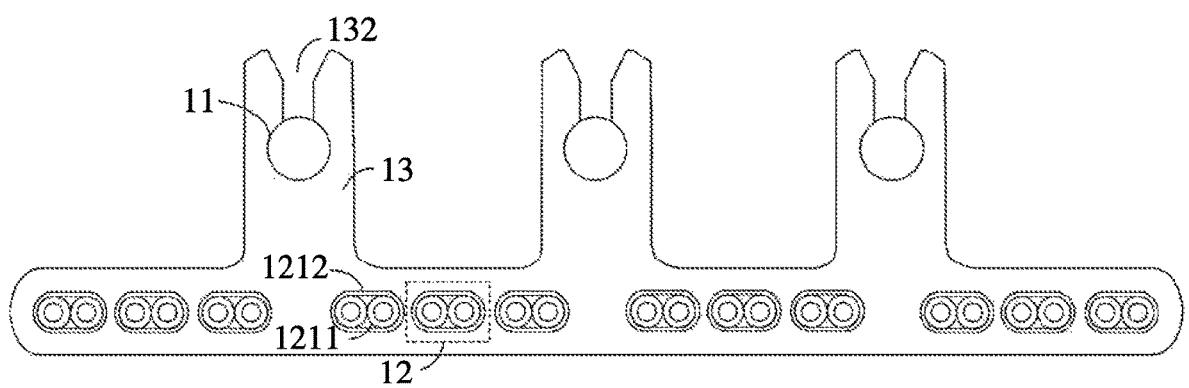
FIG. 11 shows a cross-sectional view of the light-emitting cable along the cutting line A-A' in FIG. 10A.

FIG. 11 shows a cross-sectional view of the light-emitting cable along the cutting line A-A' in FIG. 10A. As shown in FIG. 10A, FIG. 10B and FIG. 11, the light-emitting cable 10 comprises a plurality of optical fibers 11, a plurality of signal groups 12 and a jacket 13. The jacket 13 comprises a plurality of containment slots 132 which are spaced from one another. The optical fibers 11 is fastened to the jacket 13 in a one-to-one manner, wherein the optical fibers 11 may be a lightguide element, which utilizes the principle of total reflection of light to transmit light. The signal groups 12 are arranged beneath the optical fibers 11 (or arranged beneath the containment slots 132) for a certain distance. Each signal group 12 comprises at least one signal cable 1211 for transmitting signals. The optical fibers 11 and the signal groups 12 are covered by the jacket 13. The optical fibers 11 is made of a lightguide material, the jacket 13 is made of a light-transmissive material. One advantage to include the light-emitting cable 10 of the containment slots 132 is that the user may select suitable optical fibers according to actual needs, or when the optical fibers are worn out due to the life expectancy is up, it only requires replacing new optical fibers to continue using the light-emitting cable structure. Hence, the containment slots 132 can further facilitate the user to change optical fibers, thus improving the user experience.

In this embodiment, each signal group 12 further comprises a metal shielding layer 1212 covering the signal cable 1211. The metal shielding layer 1212 is used to prevent the neighboring signal group 12 from interfering each other when transmitting signals, wherein the metal shielding layer 1212 is preferably made of Aluminum foil.

Figure 12:
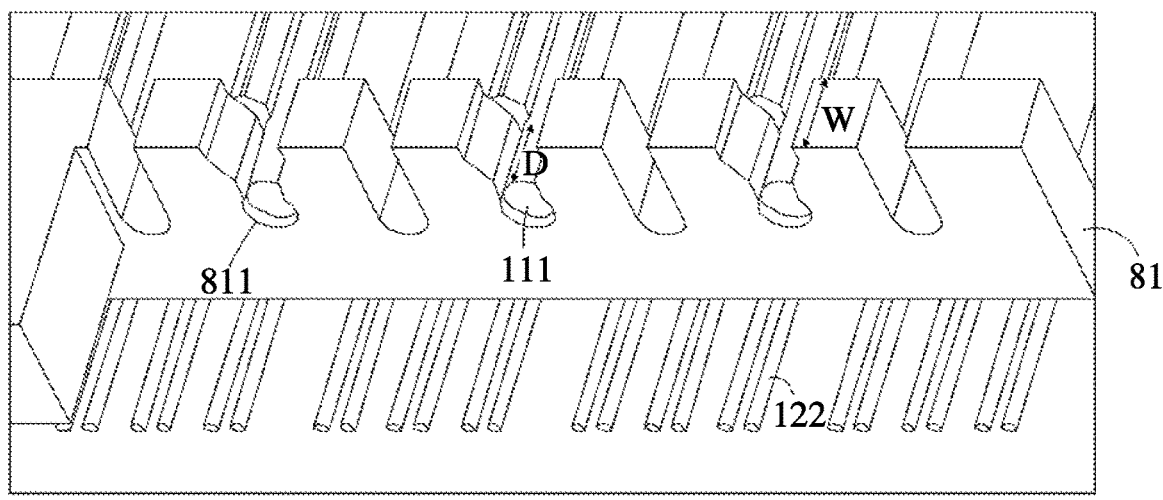
FIG. 12 shows a plurality of first protruding optical fibers being fastened to a first optical fiber positioning member according to a third embodiment of the present disclosure.

FIG. 12 shows a plurality of first protruding optical fibers 111 being fastened to a first optical fiber positioning member 81 according to a third embodiment of the present disclosure. As shown in FIG. 10A, FIG. 10B and FIG. 12, the light-emitting cable 10 further comprises a plurality of first protruding optical fibers 111 and a plurality of second protruding optical fibers 112. Each first protruding optical fiber 111 is arranged at one end of each optical fiber 11, and each second protruding optical fiber 112 is arranged at the other end of each optical fiber 11. Each first protruding optical fiber 111 and each second protruding optical fiber 112 are extensions of each corresponding optical fiber 11. Both the first protruding optical fiber 111 and the second protruding optical fiber 112 have the length D, and the first optical fiber positioning member 81 and the second optical fiber positioning member 82 have the width W along the extending direction of the optical fibers 11. The length D is not smaller than the width W, and the length D is preferably equal to the width W. The first optical fiber positioning member 81 comprises a plurality of first alignment apertures 811, and the second optical fiber positioning member 82 comprises a plurality of second alignment apertures 821. The first protruding optical fibers 111 is fastened to the first alignment aperture 811 (as shown in FIG. 12), and the second protruding optical fiber 112 is fastened to the second alignment aperture 821. The optical fibers 11 may more precisely arrange the optical fibers 11 according to the positions of the first alignment aperture 811 and the second alignment aperture 821.

The connector 40 comprises a plurality of first external connection welding pins 41. The first light-emitting module 50 is arranged on the first circuit board 20 (at one end of the light-emitting cable 10), and comprises a plurality of first light-emitting elements 51 (e.g. light-emitting diodes), wherein each first light-emitting element 51 comprises a plurality of first light-emitting element welding pins 511. The second light-emitting module 60 is arranged on the second circuit board 30 (at the other end of the light-emitting cable 10), and comprises a plurality of second light-emitting elements 61 (e.g. light-emitting diodes), wherein each second light-emitting element 61 comprises a plurality of second light-emitting element welding pins 611. The light-emitting cable 10 further comprises a plurality of first terminals 122 and a plurality of second terminals 123, each first terminal 122 is arranged at one end of each signal cable 1211, and each of the second terminals 123 is arranged at the other end of each signal cable 1211. Each first terminal 122 and each of the second terminals 123 are extensions of each corresponding signal cable 1211. The first circuit board 20 comprises: a plurality of first external connection parts 211 (arranged at first edge) and a plurality of first light-emitting elements welding parts 212 (arranged along the second edge) on first side (e.g. the front side), and a plurality of first terminals welding parts 22 (arranged along the second edge) on the second side (e.g. the back side of the first side). The second circuit board 30 comprises: a plurality of second external connection parts 311 (arranged along the second edge) and a plurality of second light-emitting elements welding part 312 (arranged at first edge) on the first side, and a plurality of second terminals welding parts 32 (arranged at first edge) on the second side. The first optical fiber positioning member 81 is arranged at the first terminals 122, and the second optical fiber positioning member 82 is arranged at the second terminals 123. The first edge may be the lower side, and the second edge may be the upper side.

Figure 13A:
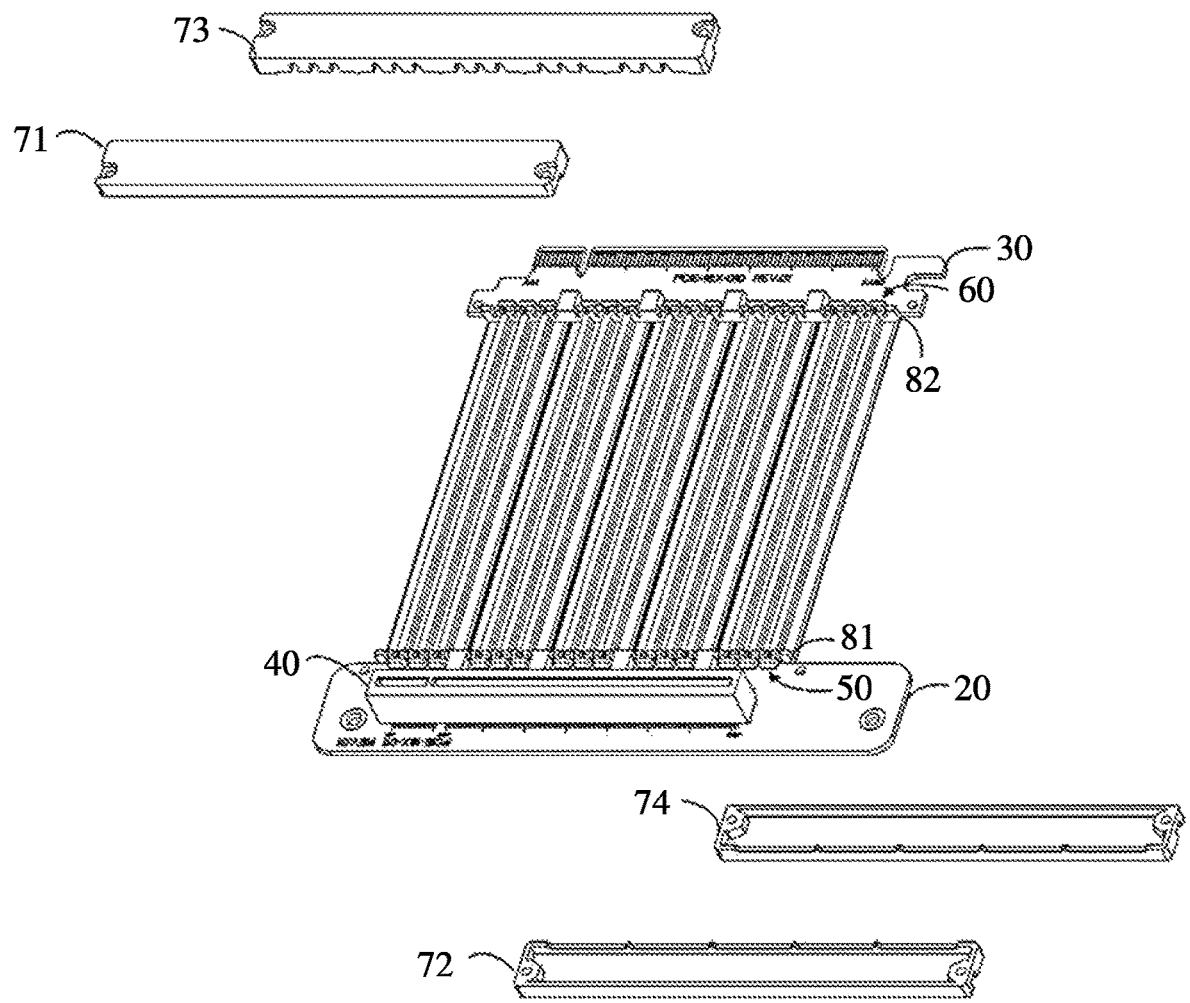
FIG. 13A shows partial assembly of the light-emitting cable structure according to the third embodiment of the present disclosure.
Figure 13B:
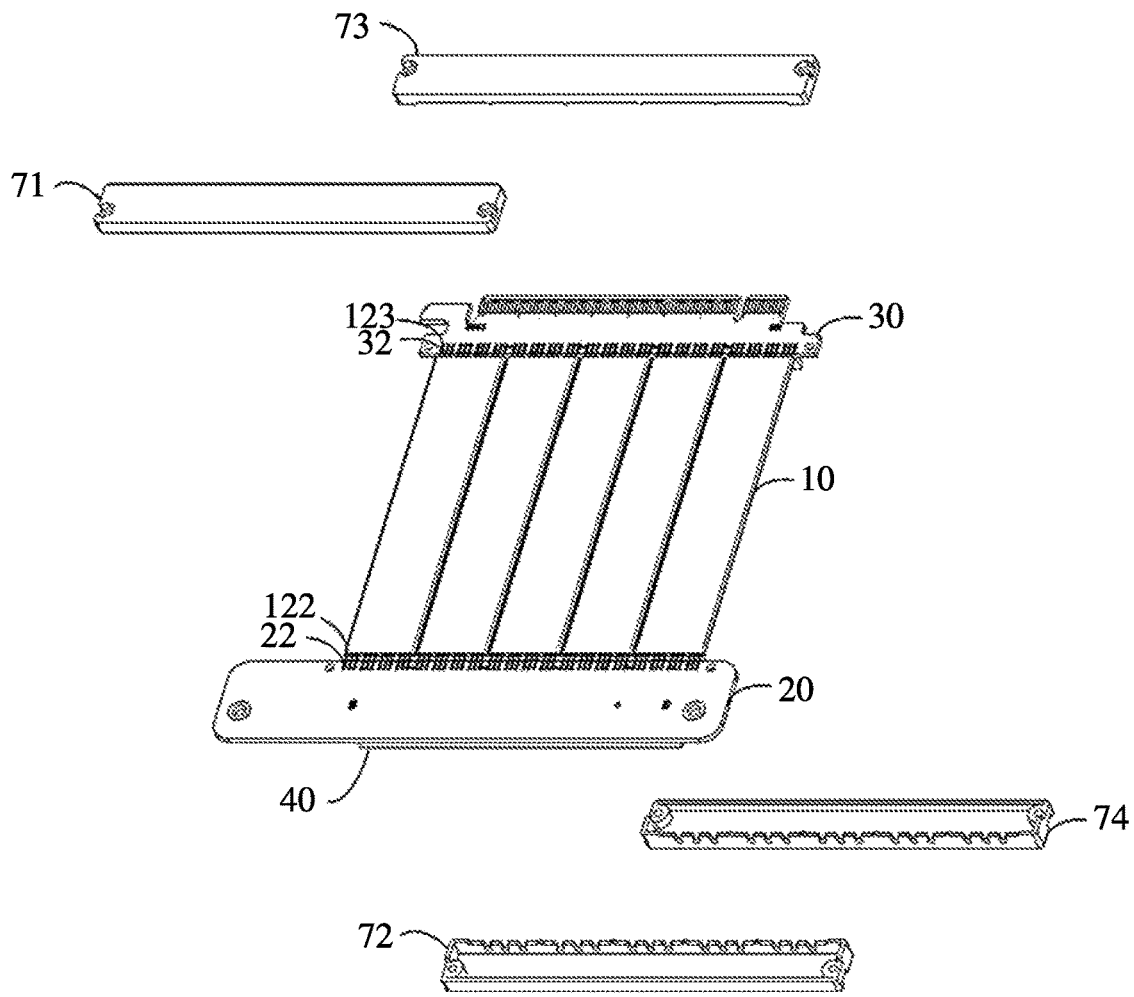
FIG. 13B shows the partial assembly of the light-emitting cable structure of FIG. 13A from the opposite perspective.

Further, the first external connection welding pins 41 on the connector 40 are connected to the first external connection parts 211 on the first circuit board 20. The first light-emitting element welding pins 511 on the first light-emitting module 50 are connected to the first light-emitting element welding parts 212 on the first circuit board 20, to achieve the electrical connection between the first light-emitting element 51 and the first circuit board 20. The second light-emitting element welding pins 611 on the second light-emitting module 60 are connected to the second light-emitting element welding part 312 on the second circuit board 30, to achieve the electrical connection between the second light-emitting element 61 and the second circuit board 30. The first terminals 122 on the light-emitting cable 10 are connected to the first terminals welding parts 22 on the first circuit board 20, and the first light-emitting element 51 contacts one end of the optical fibers 11, so that the light emitted from the first light-emitting element 51 can be transmit into the optical fibers 11. The second terminals 123 on the light-emitting cable 10 are connected to the second terminals welding parts 32 on the second circuit board 30, and the second light-emitting element 61 contacts the other end of the optical fibers 11, so that the light emitted from the second light-emitting element 61 can be transmitted into the optical fibers 11, as shown in FIG. 13A and FIG. 13B.

In other embodiments, the connector 40 is connected with other elements, making the device that comprises the light-emitting cable structure achieve the functionality of the light-emitting cable structure. Further, external electronic elements (not shown in the figure) may be connected to and the light-emitting cable structure via the second external connection parts 311 on the second circuit board 30. The external electronic element may be used to transmit power control signals, so that the first light-emitting module 50 and the second light-emitting module 60 may emit light according to the power control signals.

In the present disclosure, since the optical fibers 11 is made of a lightguide material and the jacket 13 is made of a light-transmissive material, the user may observe the light transmitted in the optical fibers 11, thus increasing the attractiveness of the product to consumers. In addition, the signal groups 12 are arranged outside the vertical projection of the optical fibers 11, making the vertical projection of the optical fibers 11 a light-transmissive area. In other words, since the signal group 12 is arranged on the light-transmissive area, the light-transmissive area may allow the light in the optical fiber to emit out, so that the user may observe the light emitted transmitted in the optical fibers 11 from various angles, thus greatly increasing the attractiveness of the product to consumers.

Figure 14A:
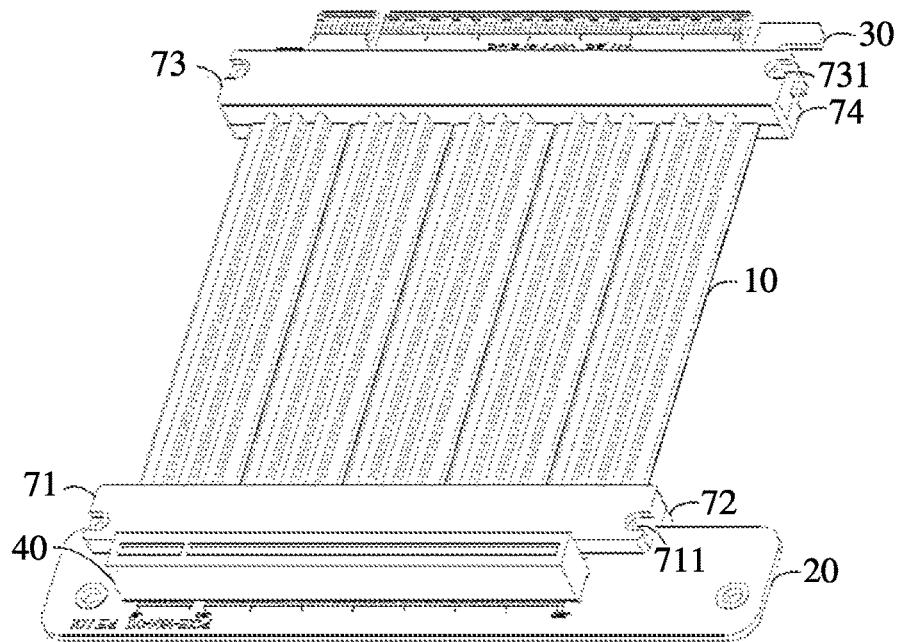
FIG. 14A shows the assembly of the light-emitting cable structure according to the third embodiment of the present disclosure.
Figure 14B:
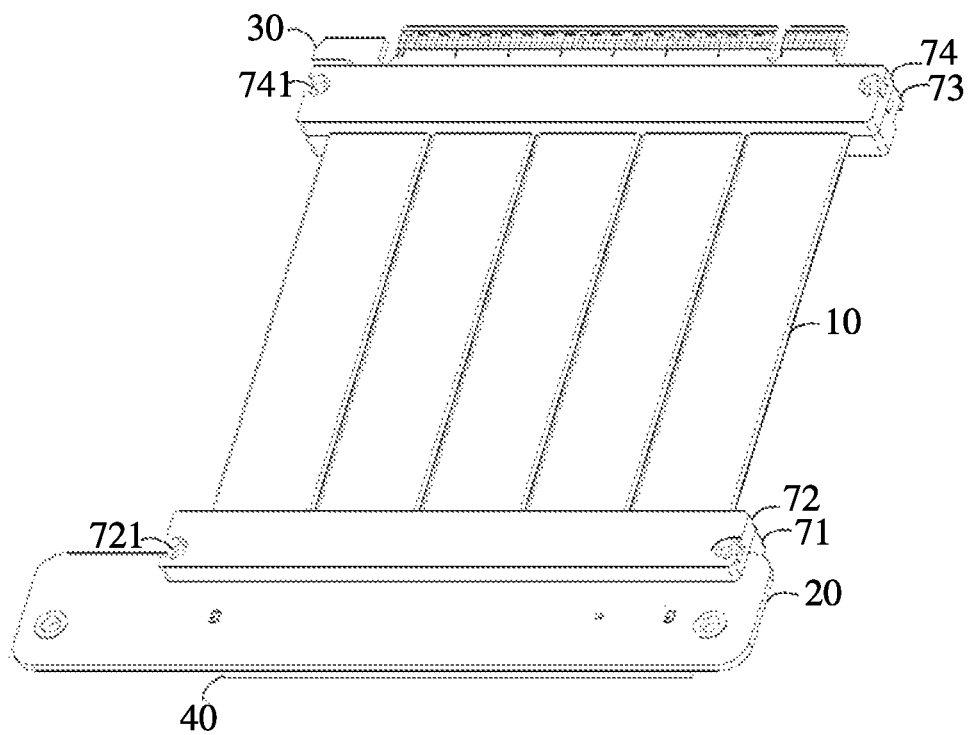
FIG. 14B shows the assembly of the light-emitting cable structure of FIG. 14A from the opposite perspective.

In this embodiment, the covering casing comprises a first casing member 71, a second casing member 72, a third casing member 73 and a fourth casing member 74. The first casing member 71 is arranged on one side of the first circuit board 20, the second casing member 72 is arranged on the other side of the first circuit board 20, the third casing member 73 is arranged on one side of the second circuit board 30, and the fourth casing member 74 is arranged on the other side of the second circuit board 30. The first circuit board 20 further comprises a first joint hole 213, and the first casing member 71 further comprises a first hole 711 and a plurality of first concave parts 712. The second casing member 72 further comprises a second hole 721 and a plurality of first containing parts 722, and the first hole 711 and the second hole 721 are aligned with the first joint hole 213 on the first circuit board 20. The first concave parts 712 is arranged corresponding to the optical fibers 11, and the first containing parts 722 is arranged corresponding to the jacket 13. Lock-fixing elements (e.g. screws and screw caps) may be used to pass through the first hole 711, the second hole 721 and the first joint hole 213 on the first circuit board 20, in order to fasten the first circuit board 20, the first casing member 71 and the second casing member 72. The second circuit board 30 further comprises a second joint hole 313, the third casing member 73 further comprises a third hole 731 and a plurality of second concave parts 732, and the fourth casing member 74 further comprises a fourth hole 741 and a plurality of second containing parts 742. The third hole 731 and the fourth hole 741 are aligned with the second joint hole 313 on the second circuit board 30. The second concave parts 732 may be arranged corresponding to the optical fibers 11, and the second containing parts 742 may be arranged corresponding to the jacket 13. Lock-fixing elements (e.g. screws and screw caps) may be used to pass through the third hole 731, the fourth hole 741 and the second joint hole 313 on the second circuit board 30, in order to lock the second circuit board 30, the third casing member 73 and the fourth casing member 74. As shown in FIG. 14A and FIG. 14B, with the arrangement of the first casing member 71, the second casing member 72, the third casing member 73 and the fourth casing member 74, the first terminals 122, the second terminals 123, the first light-emitting element 51 and the second light-emitting element 61 arranged at both ends of the light-emitting cable 10 can be covered and protected, thus preventing the light-emitting cable structure from being damaged by the external environment.

Figure 15A:
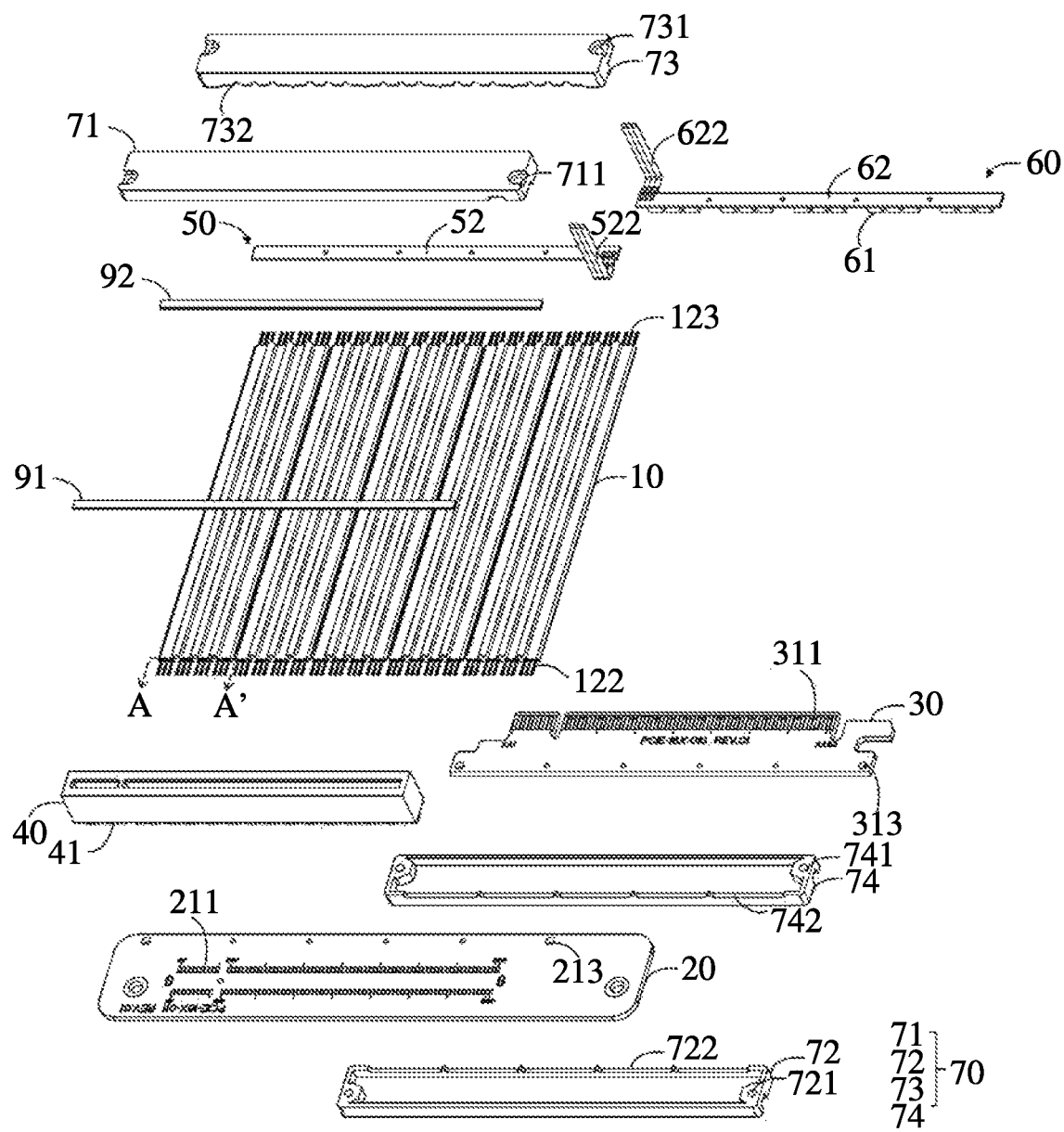
FIG. 15A shows an exploded view of the light-emitting cable structure according to a fourth embodiment of the present disclosure.
Figure 15B:
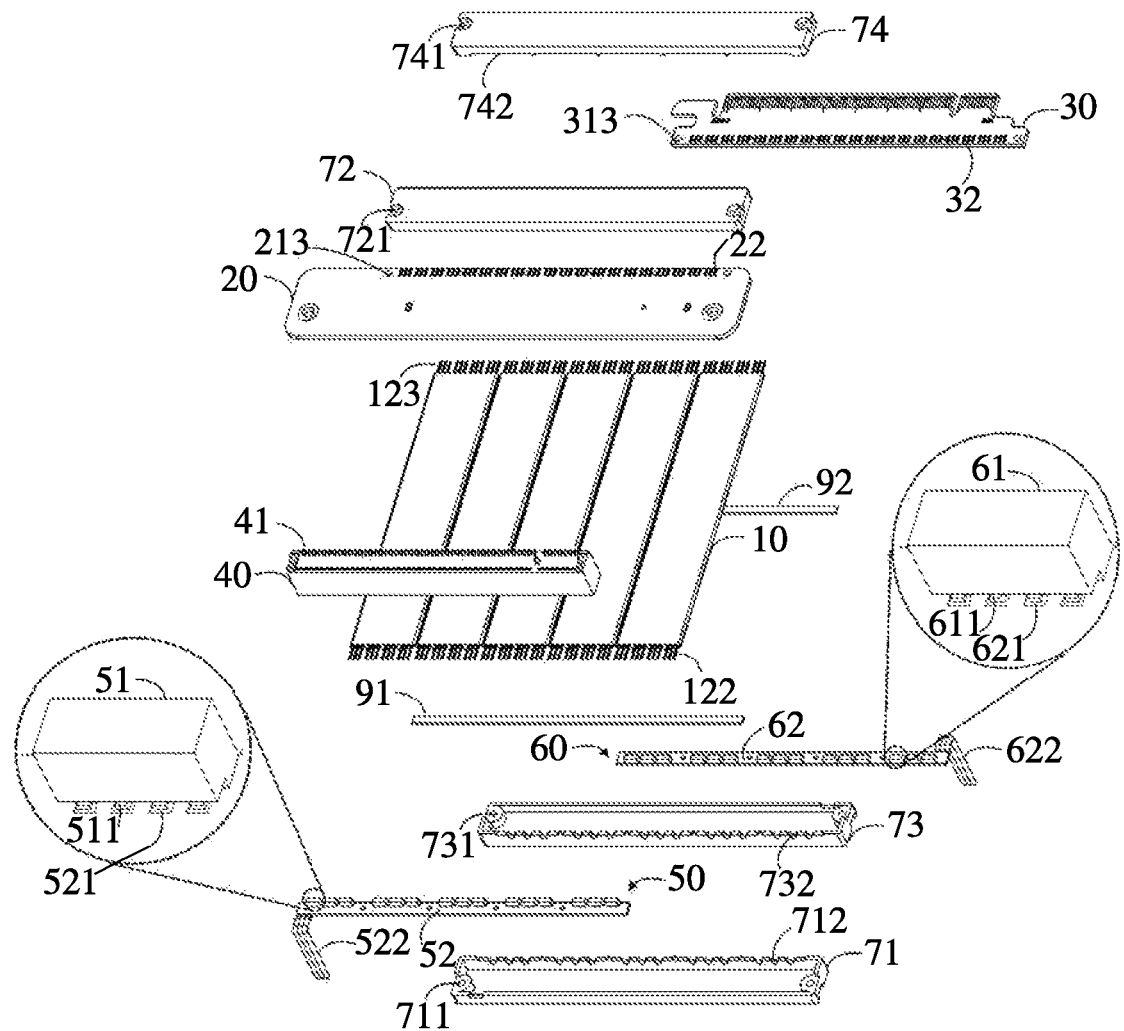
FIG. 15B shows an exploded view of the light-emitting cable structure of FIG. 15A from the opposite perspective.

Please refer to FIG. 15A and FIG. 15B. FIG. 15A shows an exploded view of the light-emitting cable structure according to a fourth embodiment of the present disclosure, and FIG. 15B shows an exploded view of the light-emitting cable structure of FIG. 15A from the opposite perspective. The light-emitting cable structure comprises a light-emitting cable 10, first circuit board 20, second circuit board 30, connector 40, first light-emitting module 50, second light-emitting module 60 and covering casing 70.

In this embodiment, the cross-sectional view of the light-emitting cable 10 along the line A-A' of FIG. 15A may refer to FIG. 2. The light-emitting cable 10 comprises a plurality of optical fibers 11, a plurality of signal groups 12, and a jacket 13. The optical fibers 10 are spaced from one another, which is a lightguide element utilizing the principle of total reflection of light to transmit light. The signal groups 12 is arranged beneath the optical fibers 11 for a certain distance.

Each signal group 12 comprises at least one signal cable 1211 for transmitting signals. The optical fibers 11 and the signal groups 12 are covered by the jacket 13. The optical fibers 11 is made of a lightguide material, and the jacket 13 is made of a light-transmissive material. The optical fibers 11 and the jacket 13 may be included in an integrated structure, which provides the benefit of simplifying the step of installing a plurality of optical fibers.

In this embodiment, each signal group 12 further comprises a metal shielding layer 1212 covering the signal cable 1211. The metal shielding layer 1212 is used to prevent the neighboring signal group 12 from interfering each other when transmitting signals, wherein the metal shielding layer 1212 is preferably made of Aluminum foil.

In this embodiment, the connector 40 comprises a plurality of first external connection welding pins 41. The first light-emitting module 50 is arranged on the first circuit board 20 (at one end of the light-emitting cable 10), and comprises a plurality of first light-emitting elements 51 (e.g. light-emitting diodes) and first external connection device 52. Each first light-emitting element 51 comprises a plurality of first light-emitting element welding pins 511. The first external connection device 52 comprises a plurality of third light-emitting element welding parts 521. The second light-emitting module 60 is arranged on the second circuit board 30 (at the other end of the light-emitting cable 10), and comprises a plurality of second light-emitting elements 61 (e.g. light-emitting diodes) and a second external connection device 62. Each second light-emitting element 61 comprises a plurality of second light-emitting element welding pins 611, and the second external connection device 62 comprises a plurality of fourth light-emitting element welding parts 621. The light-emitting cable further comprises a plurality of first terminals 122 and a plurality of second terminals 123. Each first terminal 122 is arranged at one end of each signal cable 1211, and each of the second terminals 123 is arranged at the other end of each signal cable 1211. Each first terminal 122 and each of the second terminals 123 are extensions of each corresponding signal cable 1211. The first circuit board 20 comprises a plurality of first external connection parts 211 (arranged at first edge) on first side (e.g. the front side), and a plurality of first terminals welding parts 22 (arranged along the second edge) on the second side (e.g. the back side of the first side). The second circuit board 30 comprises a plurality of second external connection parts 311 (arranged along the second edge) on the first side and a plurality of second terminals welding parts 32 (arranged at first edge) on the second side. The first edge may be the lower side, and the second edge may be the upper side.

Figure 16A:
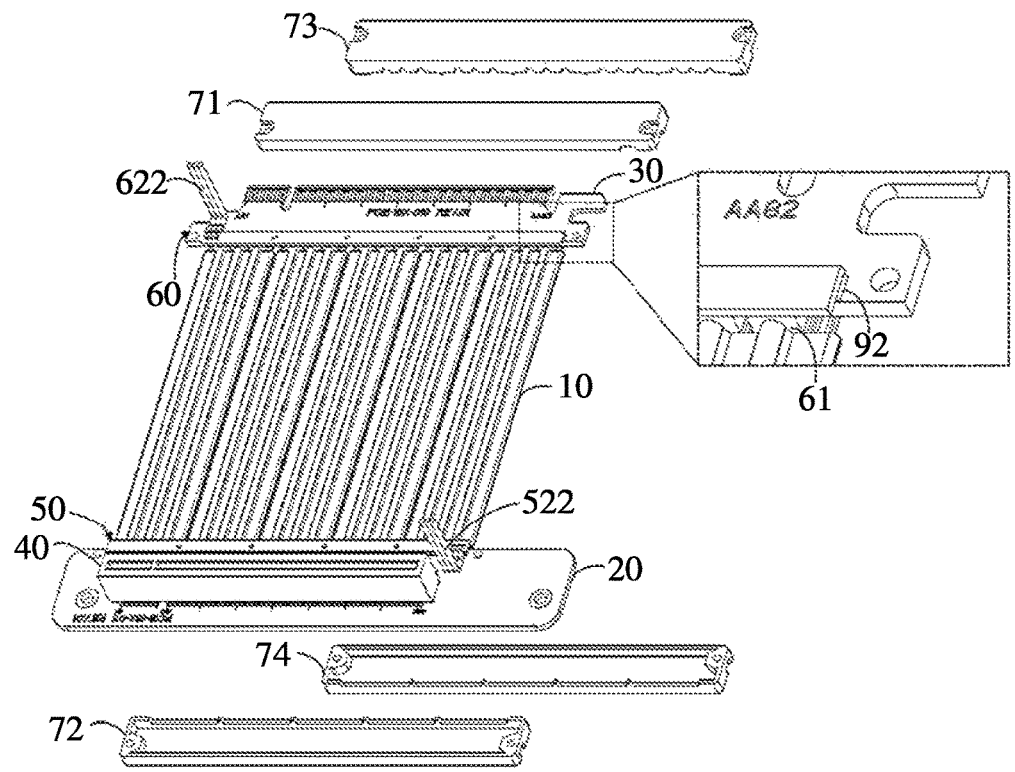
FIG. 16A shows partial assembly of the light-emitting cable structure according to the fourth embodiment of the present disclosure.
Figure 16B:
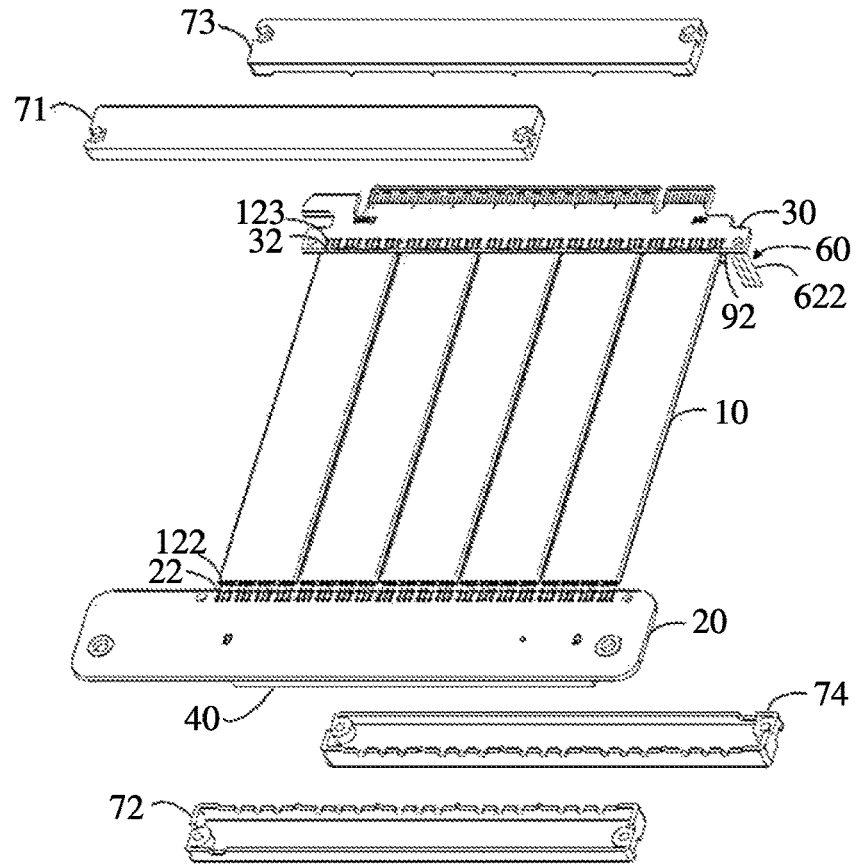
FIG. 16B shows the partial assembly of the light-emitting cable structure of FIG. 16A from the opposite perspective.

Further, the first external connection welding pins 41 on the connector 40 are connected to the first external connection parts 211 on the first circuit board 20. The first light-emitting element welding pins 511 on the first light-emitting module 50 are connected to the first light-emitting element welding parts 212 on the first circuit board 20, to achieve electrical connection between the first light-emitting element 51 and the first circuit board 20. The second light-emitting element welding pins 611 on the second light-emitting module 60 are connected to the second light-emitting element welding part 312 on the second circuit board 30, to achieve the electrical connection between the second light-emitting element 61 and the second circuit board 30. The first terminals 122 on the light-emitting cable 10 are connected to the first terminals welding parts 22 on the first circuit board 20, wherein the first light-emitting element 51 contacts one end of the optical fibers 11, so that the light emitted from the first light-emitting element 51 can be transmitted to the optical fibers 11. The second terminals 123 on the light-emitting cable 10 are connected to the second terminals welding parts 32 on the second circuit board 30, and the second light-emitting element 61 contacts the other end of the optical fibers 11, so that the light emitted from the second light-emitting element 61 can be transmitted to the optical fibers 11 as shown in FIG. 16A and FIG. 16B.

In other embodiments, the first external connection device 52 further comprises first external connection cable 522, and the second external connection device 62 further comprises a second external connection cable 622. The connector 40 and the second external connection parts 311 are connected with other elements, making the device that comprises the light-emitting cable structure achieve the functionality of the light-emitting cable structure. External electronic elements (not shown in the figure) may be connected with the light-emitting cable structure via the first external connection cable 522 of the first light-emitting module 50 and the second external connection cable 622 of the second light-emitting module 60. The external electronic element may be used to transmit power control signals, so that the first light-emitting module 50 and the second light-emitting module 60 may emit light according to the power control signals.

In the present disclosure, since the optical fibers 11 is made of a lightguide material and the jacket 13 is made of a light-transmissive material, the user may observe the light transmitted in the optical fibers 11, thus increasing the attractiveness of the product to consumers. In addition, the signal groups 12 are arranged outside the vertical projection of the optical fibers 11, making the vertical projection of the optical fibers 11 a light-transmissive area. In other words, since the signal group 12 is arranged on the light-transmissive area, the light-transmissive area may allow the light in the optical fiber to emit out, so that the user may observe the light emitted transmitted in the optical fibers 11 from various angles, thus greatly increasing the attractiveness of the product to consumers.

In this embodiment, a first supporting plate 91 is arranged between the first light-emitting module 50 and the first circuit board 20, making the height of the first light-emitting element 51 better fit the height of the optical fibers 11. Further, a second supporting plate 92 is arranged between the second light-emitting module 60 and the second circuit board 30, making the height of the second light-emitting element 61 better fit the height of the optical fibers 11.

Figure 17A:
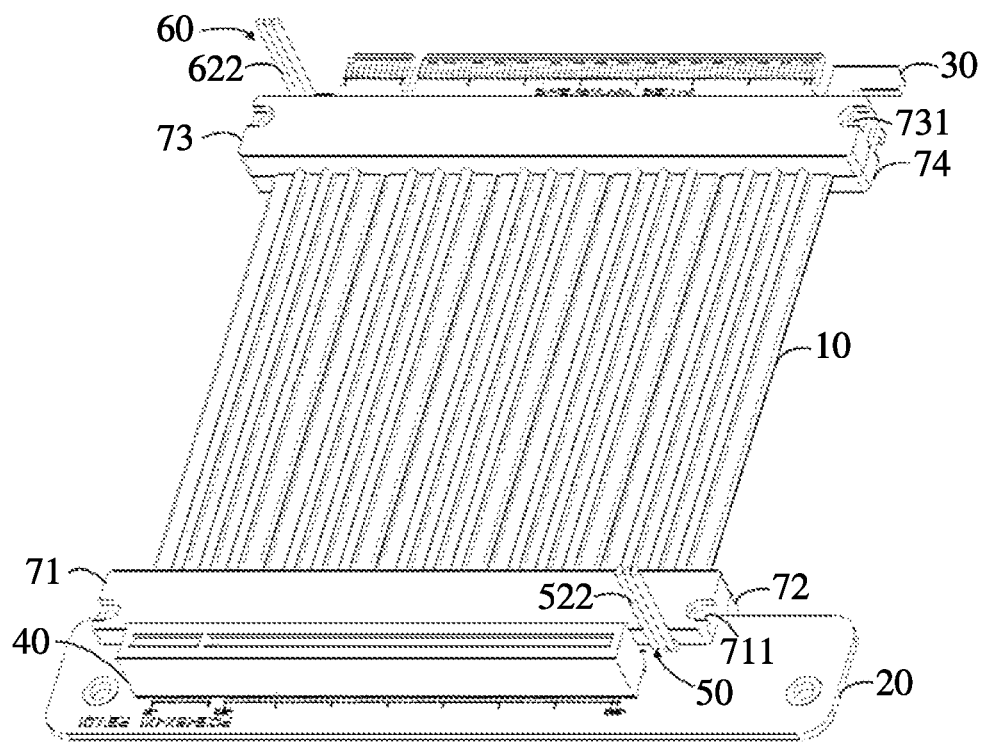
FIG. 17A shows the assembly of the light-emitting cable structure according to the fourth embodiment of the present disclosure.
Figure 17B:
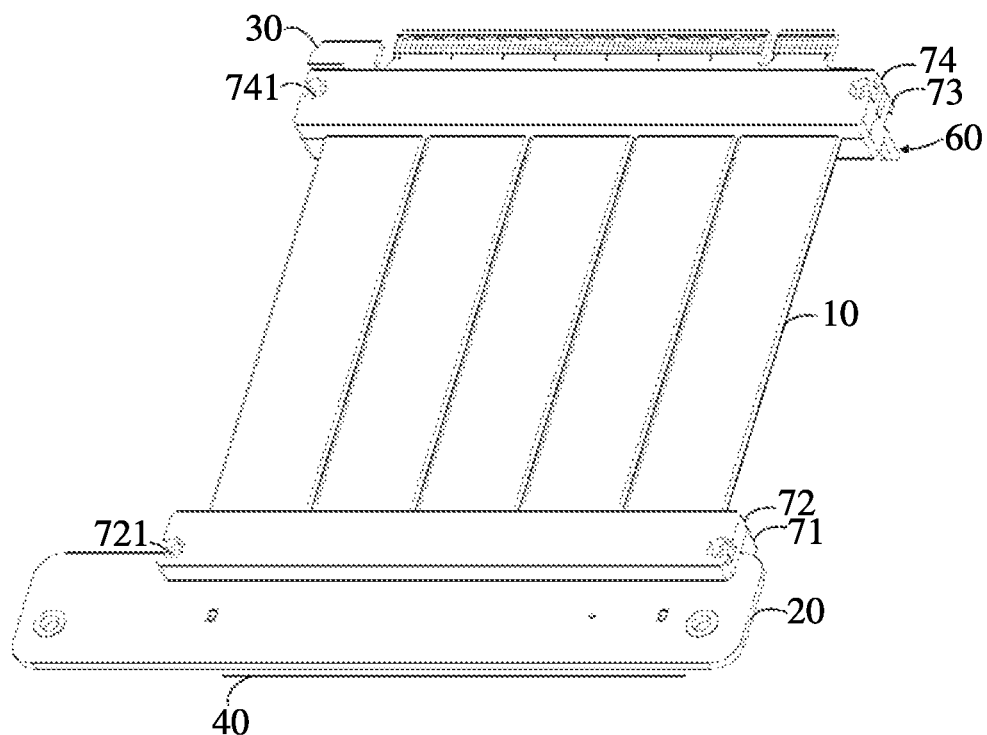
FIG. 17B shows the assembly of the light-emitting cable structure of FIG. 17A from the opposite perspective.

In this embodiment, the covering casing comprises a first casing member 71, a second casing member 72, a third casing member 73 and a fourth casing member 74. The first casing member 71 is arranged on one side of the first circuit board 20, the second casing member 72 is arranged on the other side of the first circuit board 20, the third casing member 73 is arranged on one side of the second circuit board 30, the fourth casing member 74 is arranged on the other side of the second circuit board 30. The first circuit board 20 further comprises a first joint hole 213, and the first casing member 71 further comprises a first hole 711 and a plurality of first concave parts 712. The second casing member 72 further comprises a second hole 721 and a plurality of first containing parts 722, and the first hole 711 and the second hole 721 are aligned with the first joint hole 213 on the first circuit board 20. The first concave parts 712 is arranged corresponding to the optical fibers 11, and the first containing parts 722 is arranged corresponding to the jacket 13. Lock-fixing elements (e.g. screws and screw caps) may be used to pass through the first hole 711, the second hole 721 and the first joint hole 213 on the first circuit board 20, so as to lock the first circuit board 20, the first casing member 71 and the second casing member 72. The second circuit board 30 further comprises a second joint hole 313, the third casing member 73 further comprises a third hole 731 and a plurality of second concave parts 732, and the fourth casing member 74 further comprises a fourth hole 741 and a plurality of second containing parts 742. The third hole 731 and the fourth hole 741 and the second circuit board 30 are aligned with the second joint hole 313. The second concave parts 732 are arranged corresponding to the optical fibers 11, and the second containing parts 742 may be arranged corresponding to the jacket 13. Lock-fixing elements (e.g. screws and screw caps) may be used to pass through the third hole 731, the fourth hole 741 and the second joint hole 313 on the second circuit board 30, in order to lock the second circuit board 30, the third casing member 73 and the fourth casing member 74. As shown in FIG. 17A and FIG. 17B, with the arrangement of the first casing member 71, the second casing member 72, the third casing member 73 and the fourth casing member 74, the first terminals 122, the second terminals 123, the first light-emitting element 51 and the second light-emitting element 61 arranged at both ends of the light-emitting cable 10 may be covered and protected, thus preventing the light-emitting cable structure from damages from the external environment.

Figure 18A:
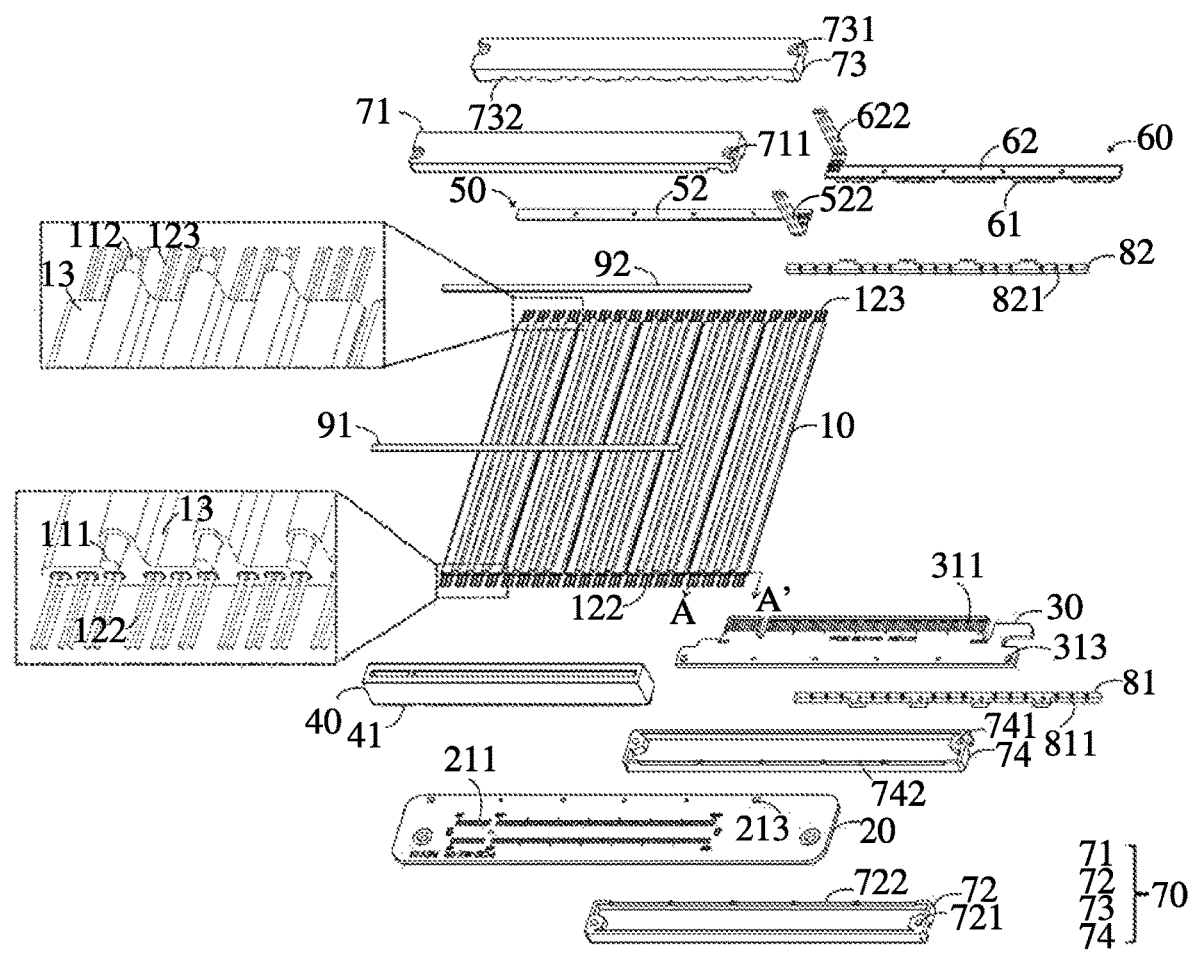
FIG. 18A shows an exploded view of the light-emitting cable structure according to a fifth embodiment of the present disclosure.
Figure 18B:
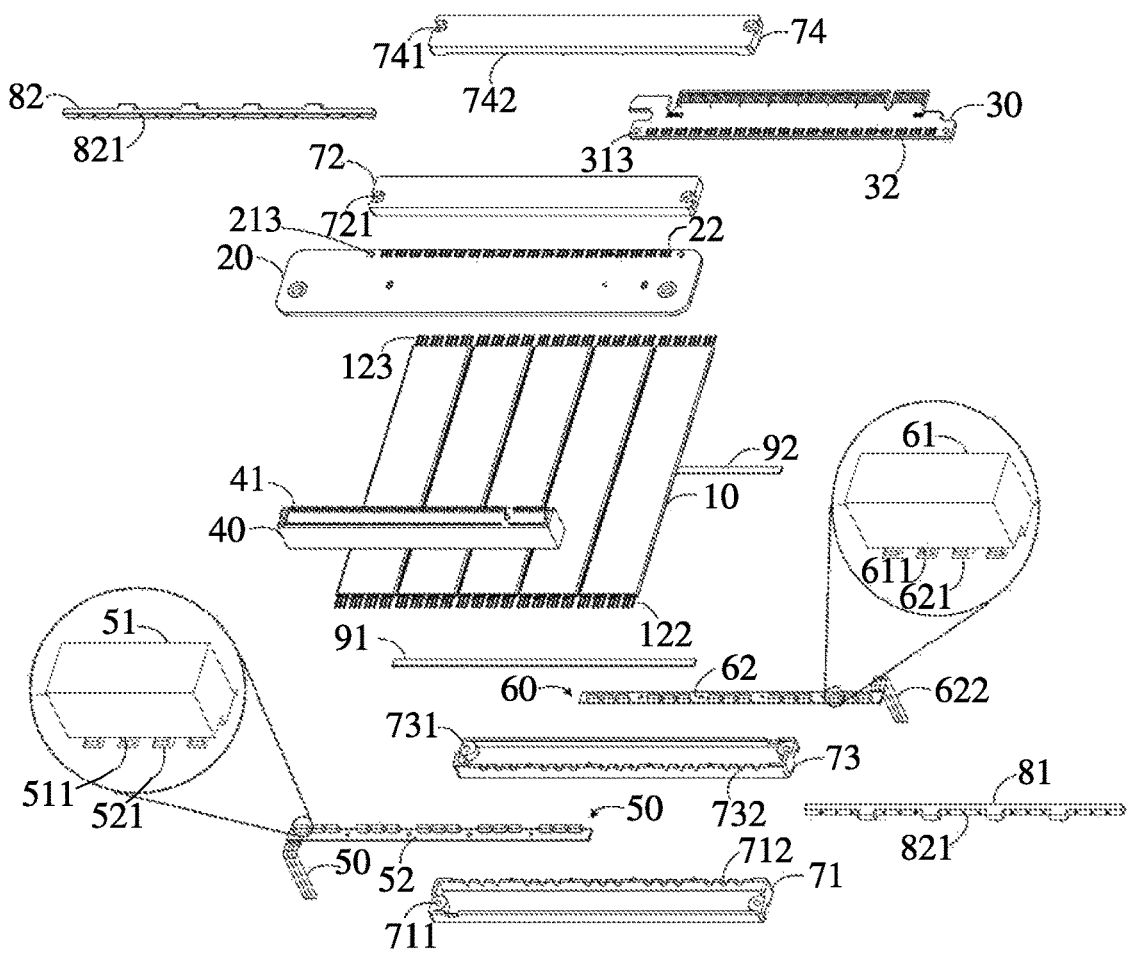
FIG. 18B shows an exploded view of the light-emitting cable structure of FIG. 18A from the opposite perspective.

Please refer to FIG. 18A and FIG. 18B. FIG. 18A shows an exploded view of the light-emitting cable structure according to a fifth embodiment of the present disclosure, and FIG. 18B shows an exploded view of the light-emitting cable structure of FIG. 18A from the opposite perspective. The light-emitting cable structure comprises a light-emitting cable 10, a first circuit board 20, a second circuit board 30, a connector 40, a first light-emitting module 50, a second light-emitting module 60, a covering casing 70, a first optical fiber positioning member 81 and a second optical fiber positioning member 82.

In this embodiment, the cross-sectional view of the light-emitting cable 10 along the line A-A' of FIG. 18A may refer to FIG. 6. The light-emitting cable 10 comprises a plurality of optical fibers 11, a plurality of signal groups 12 and jacket 13. The jacket 13 comprises a plurality of containment chambers 131, which are spaced from one another. The optical fibers 11 is fastened to the jacket 13 in a one-to-one manner, wherein the optical fibers 11 may be a lightguide element, which utilizes the principle of total reflection of light to transmit light. The signal groups 12 are arranged beneath the optical fibers 11 (or arranged beneath the containment chambers 131) for a certain distance. Each signal group 12 comprises at least one signal cable 1211 for transmitting signals. The optical fibers 11 and the signal groups 12 are covered by the jacket 13. The optical fibers 11 is made of a lightguide material, the jacket 13 is made of a light-transmissive material. One advantage to include the light-emitting cable 10 of the containment chambers 131 is that the user may select suitable optical fibers according to actual needs, or when the optical fibers are worn out due to the life expectancy is up, it only requires replacing new optical fibers to continue using the light-emitting cable structure, thus reducing the cost on the light-emitting cable structure for users.

In this embodiment, each signal group 12 further comprises a metal shielding layer 1212 covering the signal cable 1211. The metal shielding layer 1212 is used to prevent the neighboring signal group 12 from interfering each other when transmitting signals, wherein the metal shielding layer 1212 is preferably made of Aluminum foil.

Figure 19:
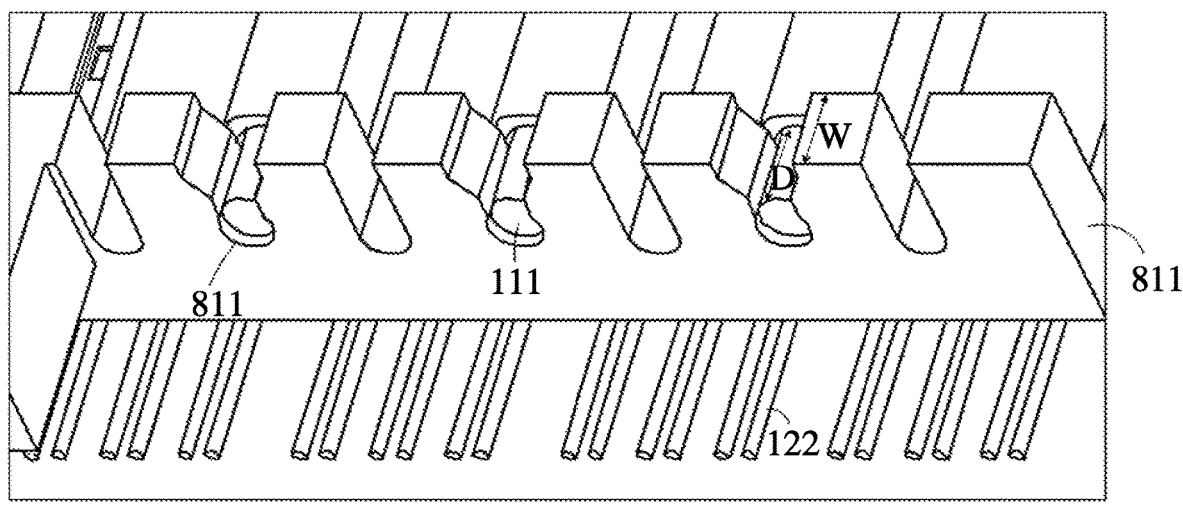
FIG. 19 shows a plurality of first protruding optical fibers being fastened to a first optical fiber positioning member according to the fifth embodiment of the present disclosure.

FIG. 19 shows a plurality of first protruding optical fibers 111 being fastened to a first optical fiber positioning member 81 according to the fifth embodiment of the present disclosure. As shown in FIG. 18A, FIG. 18B and FIG. 19, the light-emitting cable 10 further comprises a plurality of first protruding optical fibers 111 and a plurality of second protruding optical fibers 112. Each first protruding optical fiber 111 is arranged at one end of each optical fiber 11, and each second protruding optical fiber 112 is arranged at the other end of each optical fiber 11. Each first protruding optical fiber 111 and each second protruding optical fiber 112 are extensions of each corresponding optical fiber 11, and each of the first protruding optical fibers 111 and the second protruding optical fiber 112 has the length D. The first optical fiber positioning member 81 and the second optical fiber positioning member 82 have the width W along the extending direction of the optical fibers 11, wherein the length D is not smaller than the width W, and the length D is preferably equal to the width W. Further, each optical fiber 11 has the first radius R1, and each containment chamber 131 has the second radius R2, wherein the second radius R2 is not smaller than the first radius R1. Since the second radius R2 is not smaller than the first radius R1, there is certain space for the optical fibers 11 to adjust the position. In addition, the first optical fiber positioning member 81 comprises a plurality of first alignment apertures 811, and the second optical fiber positioning member 82 comprises a plurality of second alignment apertures 821. The first protruding optical fibers 111 is fastened to the first alignment aperture 811 (as shown in FIG. 19), and the second protruding optical fiber 112 is fastened to the second alignment aperture 821.

The connector 40 comprises a plurality of first external connection welding pins 41. The first light-emitting module 50 is arranged on the first circuit board 20 (at one end of the light-emitting cable 10), and comprises a plurality of first light-emitting elements 51 (e.g. light-emitting diodes). Each first light-emitting element 51 comprises a plurality of first light-emitting element welding pins 511. The second light-emitting module 60 is arranged on the second circuit board 30 (at the other end of the light-emitting cable 10), and comprises a plurality of second light-emitting elements 61 (e.g. light-emitting diodes). Each second light-emitting element 61 comprises a plurality of second light-emitting element welding pins 611. The light-emitting cable 10 further comprises a plurality of first terminals 122 and a plurality of second terminals 123, each first terminal 122 is arranged at one end of each signal cable 1211, and each second terminals 123 is arranged at the other end of each signal cable 1211. Each first terminal 122 and each of the second terminals 123 are extensions of each corresponding signal cable 1211. The first circuit board 20 comprises: a plurality of first external connection parts 211 (arranged at first edge) and a plurality of first light-emitting elements welding parts 212 (arranged along the second edge) on first side (e.g. the front side), and a plurality of first terminals welding parts 22 (arranged along the second edge) on the second side (e.g. the back side of the first side). The second circuit board 30 comprises: a plurality of second external connection parts 311 (arranged along the second edge) and a plurality of second light-emitting elements welding part 312 (arranged at first edge) on the first side, and a plurality of second terminals welding parts 32 (arranged at first edge) on the second side. The first optical fiber positioning member 81 is arranged at the first terminals 122, and the second optical fiber positioning member 82 is arranged at the second terminals 123. Note that the first edge may be the lower edge, and the second edge may be the upper edge.

Figure 20A:
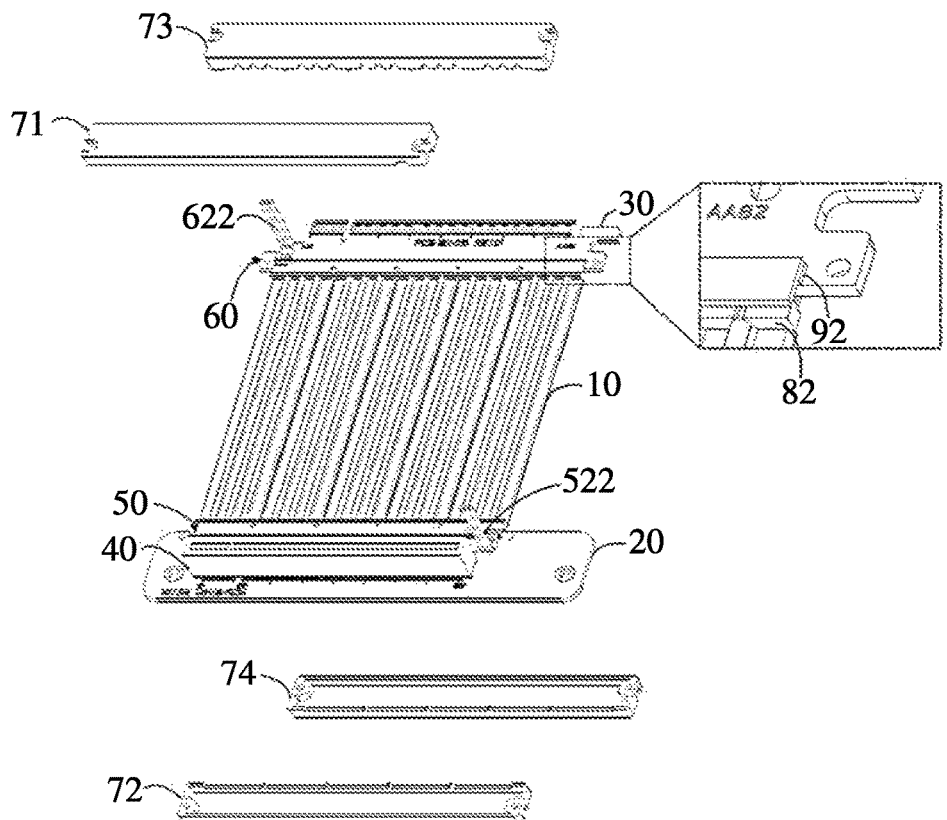
FIG. 20A shows partial assembly of the light-emitting cable structure according to the fifth embodiment of the present disclosure.
Figure 20B:
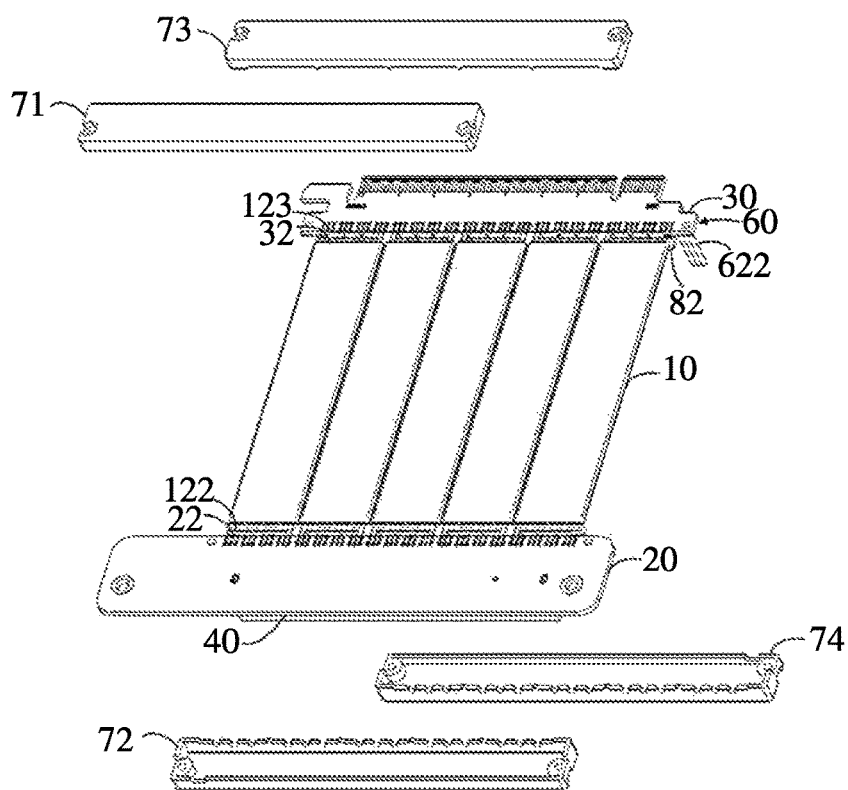
FIG. 20B shows the partial assembly of the light-emitting cable structure of FIG. 20A from the opposite perspective.
Figure 21A:
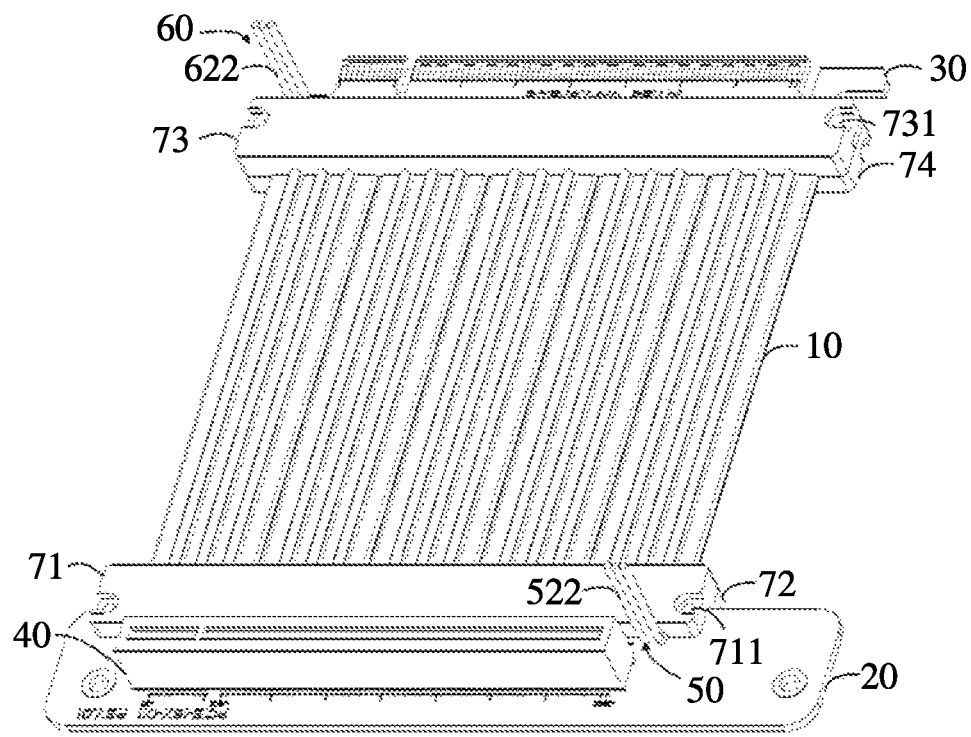
FIG. 21A shows the assembly of the light-emitting cable structure according to the fifth embodiment of the present disclosure.
Figure 21B:
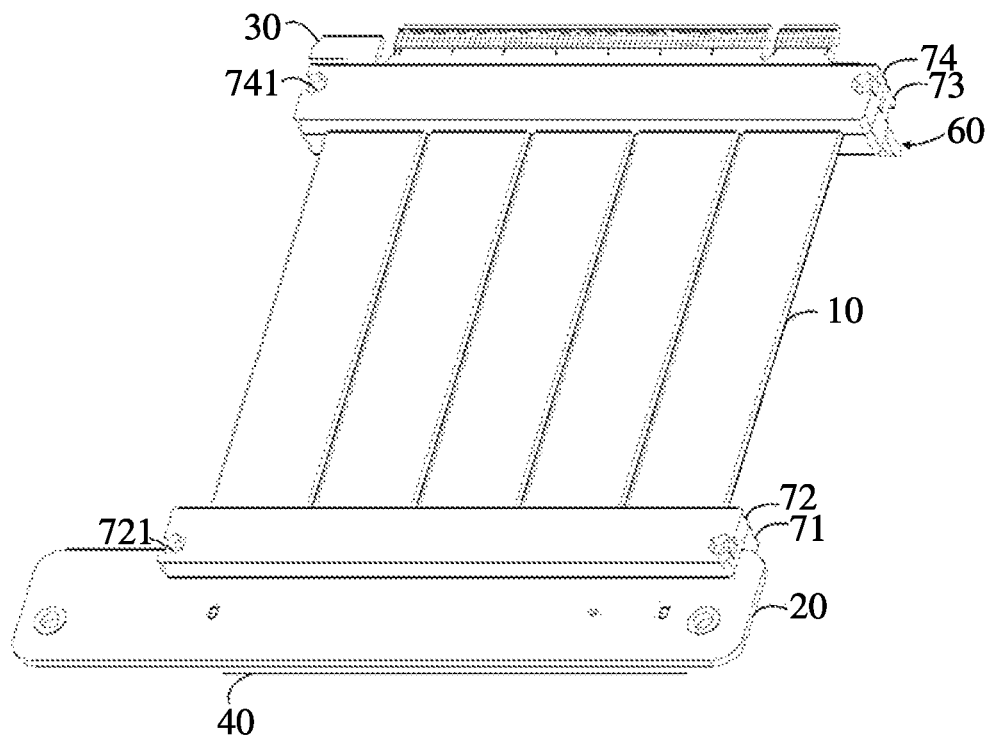
FIG. 21B shows the assembly of the light-emitting cable structure of FIG. 21A from the opposite perspective.

Further, the first external connection welding pins 41 on the connector 40 are connected to the first external connection parts 211 on the first circuit board 20. The first light-emitting element welding pins 511 on the first light-emitting element 51 are connected to the third light-emitting element welding part 521 on the first external connection device 52, to achieve the electrical connection between the first light-emitting element 51 and the first external connection device 52. The second light-emitting element welding pins 611 on the second light-emitting element 61 are connected to the fourth light-emitting element welding part 621 on the second external connection device 62, to achieve the electrical connection the second light-emitting element 61 and the second external connection device 62. The first terminals 122 on the light-emitting cable 10 are connected to the first terminals welding parts 22 on the first circuit board 20, and the first light-emitting element 51 contacts with one end of the optical fibers 11, so that the light emitted from the first light-emitting element 51 can be transmitted to the optical fibers 11. The second terminals 123 on the light-emitting cable 10 are connected to the second terminals welding parts 32 on the second circuit board 30, and the second light-emitting element 61 contacts with the other end of the optical fibers 11, so that the light transmitted by the second light-emitting element 61 can be transmitted to the optical fibers 11, as shown in FIG. 20A and FIG. 20B.

In other embodiments, the first external connection device 52 further comprises first external connection cable 522, and the second external connection device 62 further comprises a second external connection cable 622. The connector 40 and the second external connection parts 311 are connected with other elements, making the device that comprises the light-emitting cable structure achieve the functionality of the light-emitting cable structure. External electronic elements (not shown in the figure) may be connected with the light-emitting cable structure via the first external connection cable 522 of the first light-emitting module 50 and the second external connection cable 622 of the second light-emitting module 60. The external electronic element may be used to transmit power control signals, so that the first light-emitting module 50 and the second light-emitting module 60 may emit light according to the power control signals.

In the present disclosure, since the optical fibers 11 is made of a lightguide material and the jacket 13 is made of a light-transmissive material, the user may observe the light transmitted in the optical fibers 11, thus increasing the attractiveness of the product to consumers. In addition, the signal groups 12 are arranged outside the vertical projection of the optical fibers 11, making the vertical projection of the optical fibers 11 a light-transmissive area. In other words, since the signal group 12 is arranged on the light-transmissive area, the light-transmissive area may allow the light in the optical fiber to emit out, so that the user may observe the light emitted transmitted in the optical fibers 11 from various angles, thus greatly increasing the attractiveness of the product to consumers.

In this embodiment, a first supporting plate 91 is arranged between the first light-emitting module 50 and the first circuit board 20, making the height of the first light-emitting element 51 better fit the height of the optical fibers 11. Further, a second supporting plate 92 is arranged between the second light-emitting module 60 and the second circuit board 30, making the height of the second light-emitting element 61 better fit the height of the optical fibers 11.

In this embodiment, the covering casing comprises a first casing member 71, a second casing member 72, a third casing member 73 and a fourth casing member 74. The first casing member 71 is arranged on one side of the first circuit board 20, the second casing member 72 is arranged on the other side of the first circuit board 20, the third casing member 73 is arranged on one side of the second circuit board 30, the fourth casing member 74 is arranged on the other side of the second circuit board 30. The first circuit board 20 further comprises a first joint hole 213, and the first casing member 71 further comprises a first hole 711 and a plurality of first concave parts 712. The second casing member 72 further comprises a second hole 721 and a plurality of first containing parts 722, and the first hole 711 and the second hole 721 are aligned with the first joint hole 213 on the first circuit board 20. The first concave parts 712 is arranged corresponding to the optical fibers 11, and the first containing parts 722 is arranged corresponding to the jacket 13. Lock-fixing elements (e.g. screws and screw caps) may be used to pass through the first hole 711, the second hole 721 and the first joint hole 213 on the first circuit board 20, so as to lock the first circuit board 20, the first casing member 71 and the second casing member 72. The second circuit board 30 further comprises a second joint hole 313, the third casing member 73 further comprises a third hole 731 and a plurality of second concave parts 732, and the fourth casing member 74 further comprises a fourth hole 741 and a plurality of second containing parts 742. The third hole 731 and the fourth hole 741 and the second circuit board 30 are aligned with the second joint hole 313. The second concave parts 732 are arranged corresponding to the optical fibers 11, and the second containing parts 742 may be arranged corresponding to the jacket 13. Lock-fixing elements (e.g. screws and screw caps) may be used to pass through the third hole 731, the fourth hole 741 and the second joint hole 313 on the second circuit board 30, in order to lock the second circuit board 30, the third casing member 73 and the fourth casing member 74. As shown in FIG. 17A and FIG. 17B, with the arrangement of the first casing member 71, the second casing member 72, the third casing member 73 and the fourth casing member 74, the first terminals 122, the second terminals 123, the first light-emitting element 51 and the second light-emitting element 61 arranged at both ends of the light-emitting cable 10 may be covered and protected, thus preventing the light-emitting cable structure from damages from the external environment.

Figure 22A:
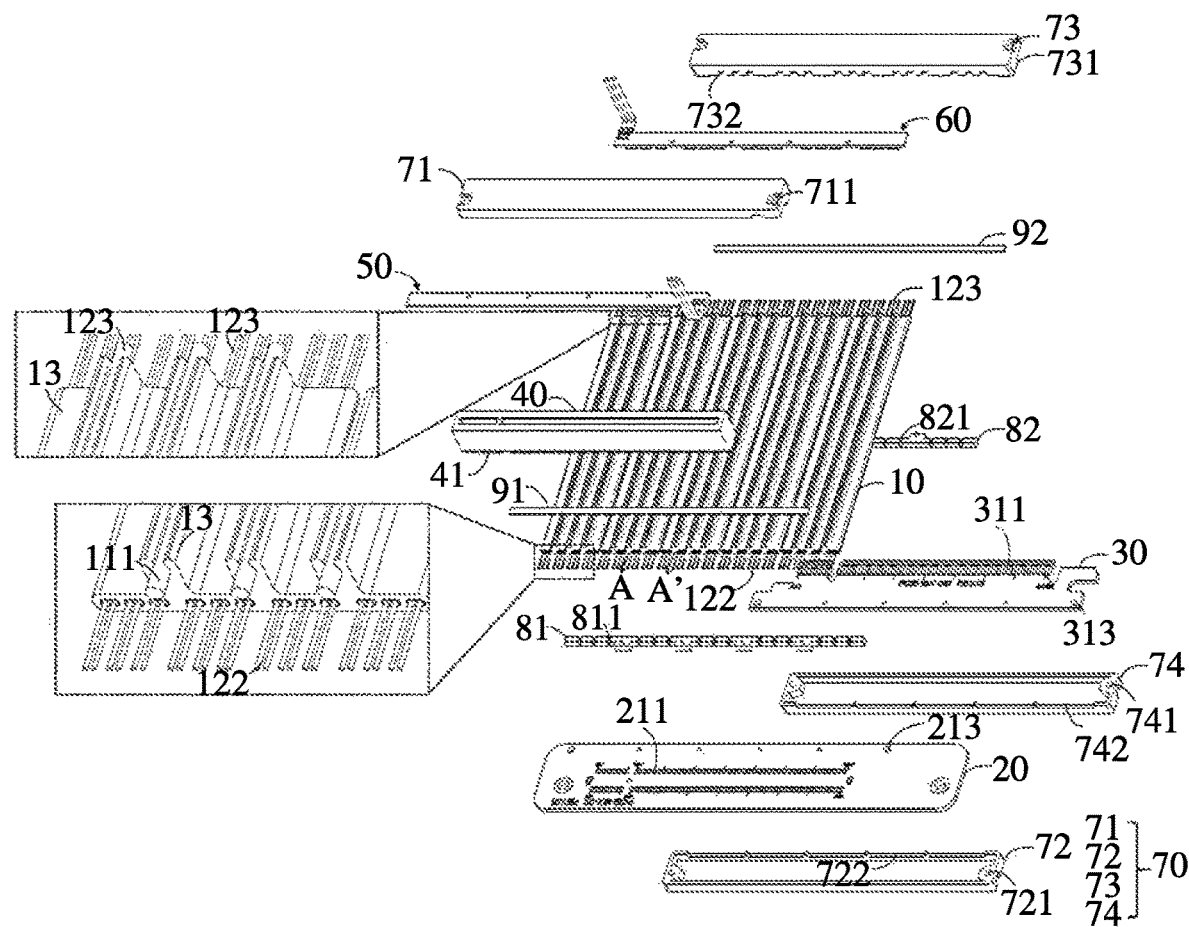
FIG. 22A shows an exploded view of the light-emitting cable structure according to a sixth embodiment of the present disclosure.
Figure 22B:
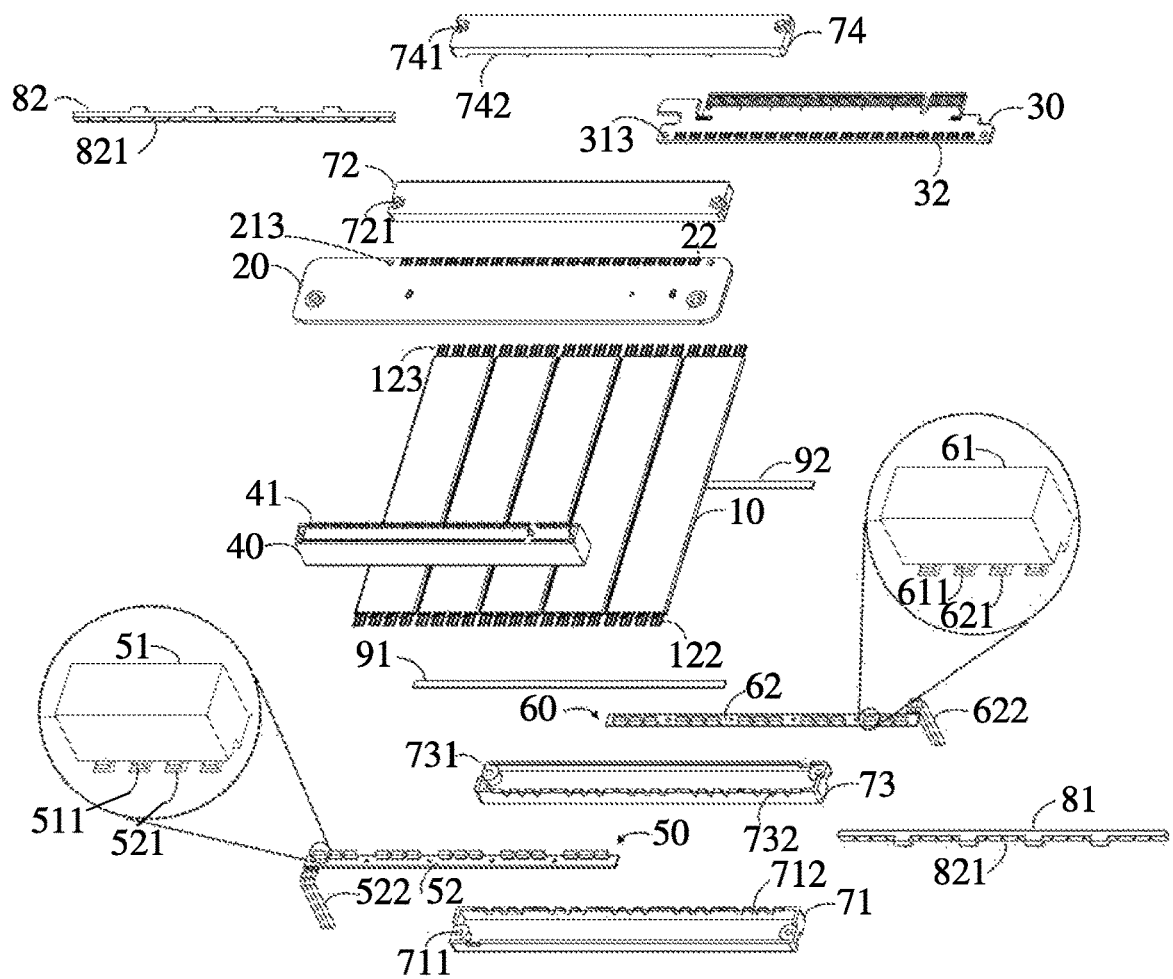
FIG. 22B shows an exploded view of the light-emitting cable structure of FIG. 22A from the opposite perspective.

Please refer to FIG. 22A and FIG. 22B. FIG. 22A shows an exploded view of the light-emitting cable structure according to a sixth embodiment of the present disclosure, and FIG. 22B shows an exploded view of the light-emitting cable structure of FIG. 22A from the opposite perspective. The light-emitting cable structure comprises a light-emitting cable 10, a first circuit board 20, a second circuit board 30, a connector 40, a first light-emitting module 50, a second light-emitting module 60, a covering casing 70, a first optical fiber positioning member 81 and a second optical fiber positioning member 82.

In this embodiment, the cross-sectional view of the light-emitting cable 10 along the line A-A' of FIG. 22A may refer to FIG. 11. The light-emitting cable 10 comprises a plurality of optical fibers 11, a plurality of signal groups 12 and jacket 13. The jacket 13 comprises a plurality of containment slots 132, each spaced from one another. The optical fibers 11 in a one-to-one manner is fastened to the jacket 13. The optical fibers 11 is a lightguide element, which utilizes the principle of total reflection of light to transmit light. The signal groups 12 is arranged beneath the optical fibers 11 (or arranged beneath the containment slots 132) for a certain distance, and each signal group 12 comprises at least one signal cable 1211 for transmitting signals; the optical fibers 11 and the signal groups 12 are covered by the jacket 13, and the optical fibers 11 is made of a lightguide material, the jacket 13 is made of a light-transmissive material. One advantage to include the light-emitting cable 10 of the containment slots 132 is that the user may select suitable optical fibers according to actual needs, or when the optical fibers are worn out due to the life expectancy is up, it only requires replacing new optical fibers to continue using the light-emitting cable structure, thus reducing the cost on the light-emitting cable structure for users.

Figure 23:
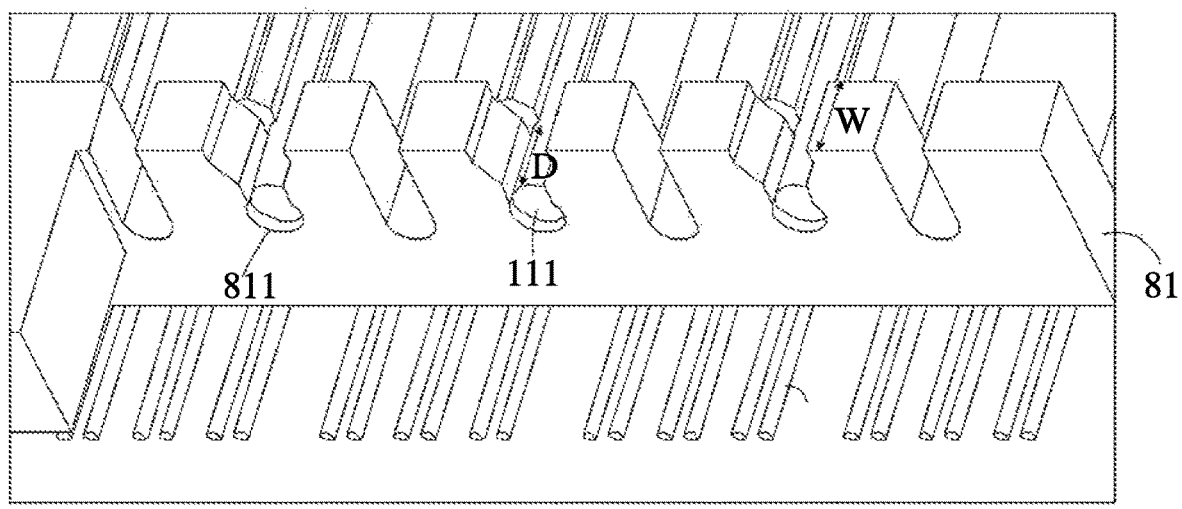
FIG. 23 shows a plurality of first protruding optical fibers being fastened to a first optical fiber positioning member according to the sixth embodiment of the present disclosure.

In this embodiment, each signal group 12 further comprises a metal shielding layer 1212 covering the signal cable 1211. The metal shielding layer 1212 is used to prevent the neighboring signal group 12 from interfering each other when transmitting signals, wherein the metal shielding layer 1212 is preferably made of Aluminum foil. FIG. 23 shows a plurality of first protruding optical fibers 111 being fastened to a first optical fiber positioning member 81 according to the sixth embodiment of the present disclosure. As shown in FIG. 22A, FIG. 22B and FIG. 23, the light-emitting cable 10 further comprises a plurality of first protruding optical fibers 111 and a plurality of second protruding optical fibers 112. Each first protruding optical fiber 111 is arranged at one end of each optical fiber 11, and each second protruding optical fiber 112 is arranged at the end of each optical fiber 11, each first protruding optical fiber 111 and each second protruding optical fiber 112 are extension of each optical fiber 11. Both the first protruding optical fiber 111 and the second protruding optical fiber 112 have the length D. The first optical fiber positioning member 81 and the second optical fiber positioning member 82 have the width W along the extending direction of the optical fibers 11, wherein the length D is not smaller than the width W, and the length D preferably equal to the width W. The first optical fiber positioning member 81 comprises a plurality of first alignment apertures 811, and the second optical fiber positioning member 82 comprises a plurality of second alignment apertures 821. The first protruding optical fibers 111 is fastened to the first alignment aperture 811 (as shown in FIG. 23), and the second protruding optical fiber 112 is fastened to the second alignment aperture 821. The optical fibers 11 may more precisely arrange the optical fibers 11 according to the positions of the first alignment aperture 811 and the second alignment aperture 821.

The connector 40 comprises a plurality of first external connection welding pins 41. The first light-emitting module 50 is arranged on the first circuit board 20 (at one end of the light-emitting cable 10), and comprises a plurality of first light-emitting elements 51 (e.g. light-emitting diodes). Each first light-emitting element 51 comprises a plurality of first light-emitting element welding pins 511. The second light-emitting module 60 is arranged on the second circuit board 30 (at the other end of the light-emitting cable 10), and comprises a plurality of second light-emitting elements 61 (e.g. light-emitting diodes). Each second light-emitting element 61 comprises a plurality of second light-emitting element welding pins 611. The light-emitting cable 10 further comprises a plurality of first terminals 122 and a plurality of second terminals 123, each first terminal 122 is arranged at one end of each signal cable 1211, and each second terminals 123 is arranged at the other end of each signal cable 1211. Each first terminal 122 and each of the second terminals 123 are extensions of each corresponding signal cable 1211. The first circuit board 20 comprises: a plurality of first external connection parts 211 (arranged at first edge) and a plurality of first light-emitting elements welding parts 212 (arranged along the second edge) on first side (e.g. the front side), and a plurality of first terminals welding parts 22 (arranged along the second edge) on the second side (e.g. the back side of the first side). The second circuit board 30 comprises: a plurality of second external connection parts 311 (arranged along the second edge) and a plurality of second light-emitting elements welding part 312 (arranged at first edge) on the first side, and a plurality of second terminals welding parts 32 (arranged at first edge) on the second side. The first optical fiber positioning member 81 is arranged at the first terminals 122, and the second optical fiber positioning member 82 is arranged at the second terminals 123. Note that the first edge may be the lower edge, and the second edge may be the upper edge.

Figure 24A:
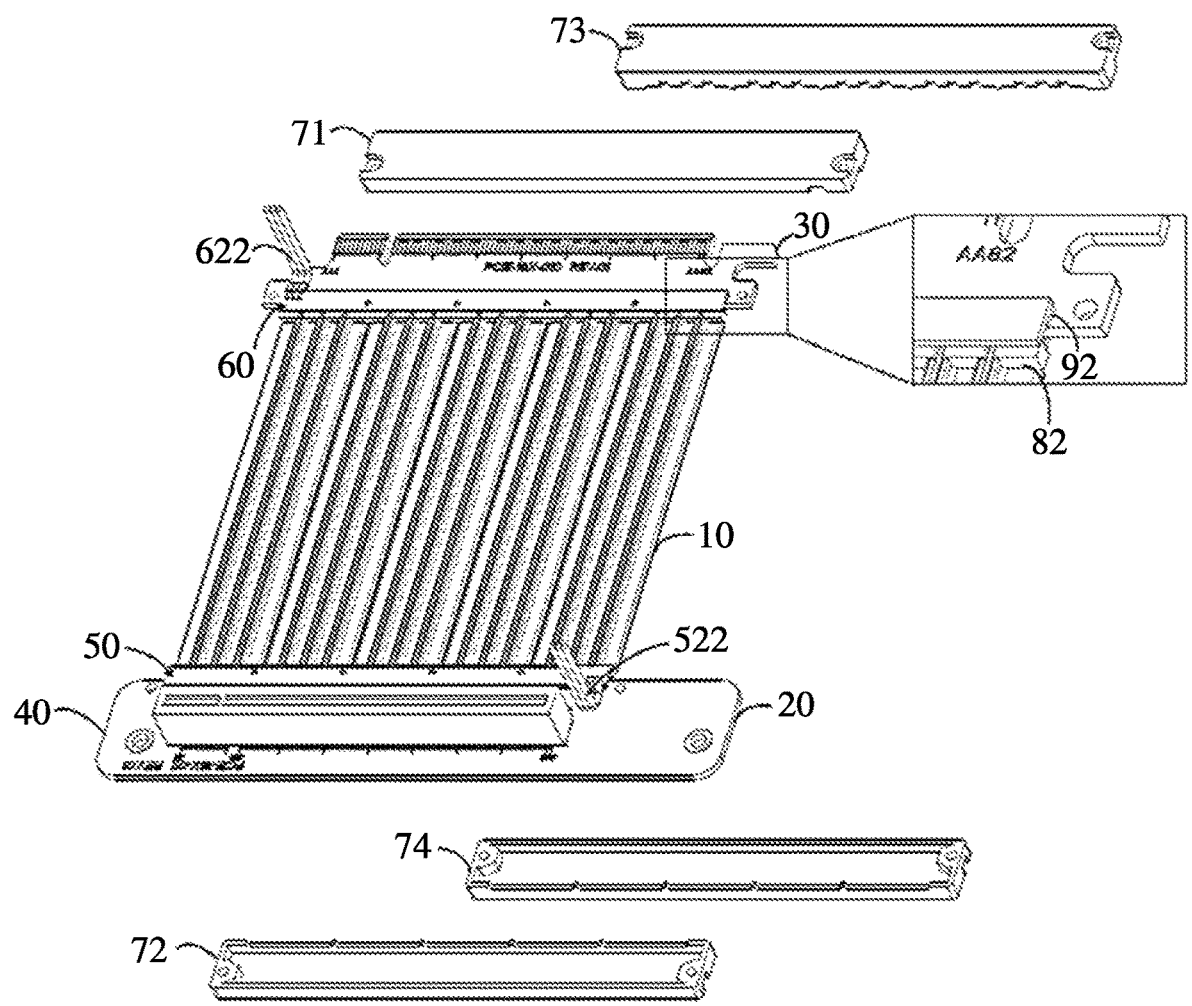
FIG. 24A shows partial assembly of the light-emitting cable structure according to the sixth embodiment of the present disclosure.
Figure 24B:
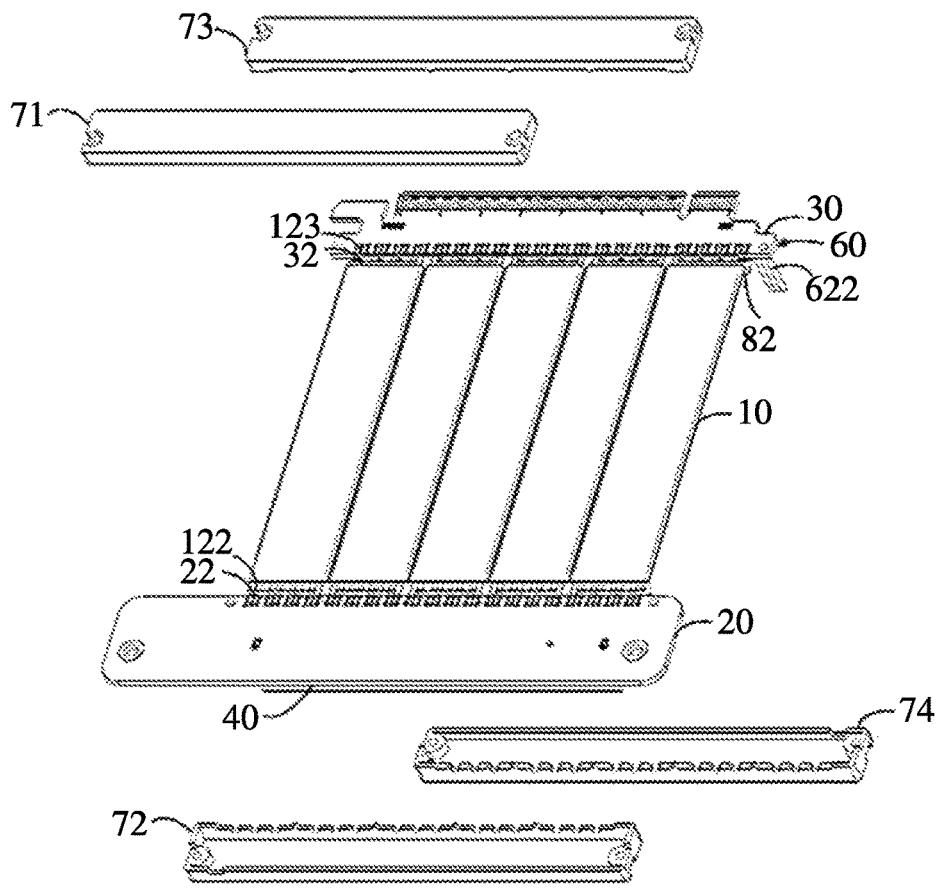
FIG. 24B shows the partial assembly of the light-emitting cable structure of FIG. 24A from the opposite perspective.

Further, the first external connection welding pins 41 on the connector 40 are connected to the first external connection parts 211 on the first circuit board 20. The first light-emitting element welding pins 511 on the first light-emitting element 51 are connected to the third light-emitting element welding part 521 on the first external connection device 52, to achieve the electrical connection between the first light-emitting element 51 and the first external connection device 52. The second light-emitting element welding pins 611 on the second light-emitting element 61 are connected to the fourth light-emitting element welding part 621 on the second external connection device 62, to achieve the electrical connection the second light-emitting element 61 and the second external connection device 62. The first terminals 122 on the light-emitting cable 10 are connected to the first terminals welding parts 22 on the first circuit board 20, and the first light-emitting element 51 contacts with one end of the optical fibers 11, so that the light emitted from the first light-emitting element 51 can be transmitted to the optical fibers 11. The second terminals 123 on the light-emitting cable 10 are connected to the second terminals welding parts 32 on the second circuit board 30, and the second light-emitting element 61 contacts with the other end of the optical fibers 11, so that the light transmitted by the second light-emitting element 61 can be transmitted to the optical fibers 11, as shown in FIG. 24A and FIG. 24B.

In other embodiments, the first external connection device 52 further comprises first external connection cable 522, and the second external connection device 62 further comprises a second external connection cable 622. The connector 40 and the second external connection parts 311 are connected with other elements, making the device that comprises the light-emitting cable structure achieve the functionality of the light-emitting cable structure. External electronic elements (not shown in the figure) may be connected with the light-emitting cable structure via the first external connection cable 522 of the first light-emitting module 50 and the second external connection cable 622 of the second light-emitting module 60. The external electronic element may be used to transmit power control signals, so that the first light-emitting module 50 and the second light-emitting module 60 may emit light according to the power control signals.

In the present disclosure, since the optical fibers 11 is made of a lightguide material and the jacket 13 is made of a light-transmissive material, the user may observe the light transmitted in the optical fibers 11, thus increasing the attractiveness of the product to consumers. In addition, the signal groups 12 are arranged outside the vertical projection of the optical fibers 11, making the vertical projection of the optical fibers 11 a light-transmissive area. In other words, since the signal group 12 is arranged on the light-transmissive area, the light-transmissive area may allow the light in the optical fiber to emit out, so that the user may observe the light emitted transmitted in the optical fibers 11 from various angles, thus greatly increasing the attractiveness of the product to consumers.

In this embodiment, a first supporting plate 91 is arranged between the first light-emitting module 50 and the first circuit board 20, making the height of the first light-emitting element 51 better fit the height of the optical fibers 11. Further, a second supporting plate 92 is arranged between the second light-emitting module 60 and the second circuit board 30, making the height of the second light-emitting element 61 better fit the height of the optical fibers 11.

Figure 25A:
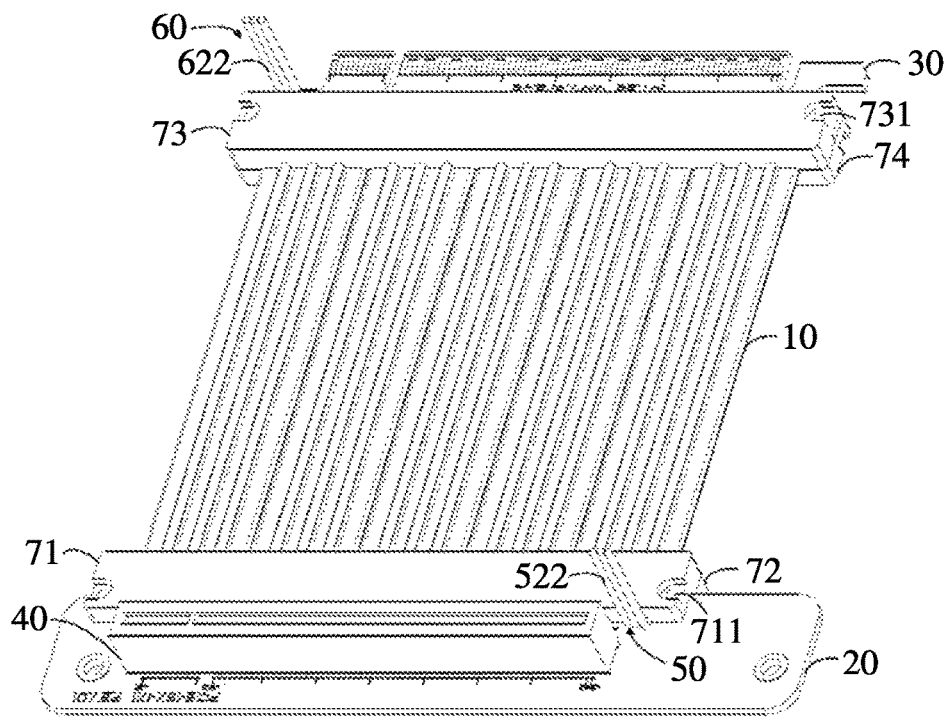
FIG. 25A shows the assembly of the light-emitting cable structure according to the sixth embodiment of the present disclosure.
Figure 25B:
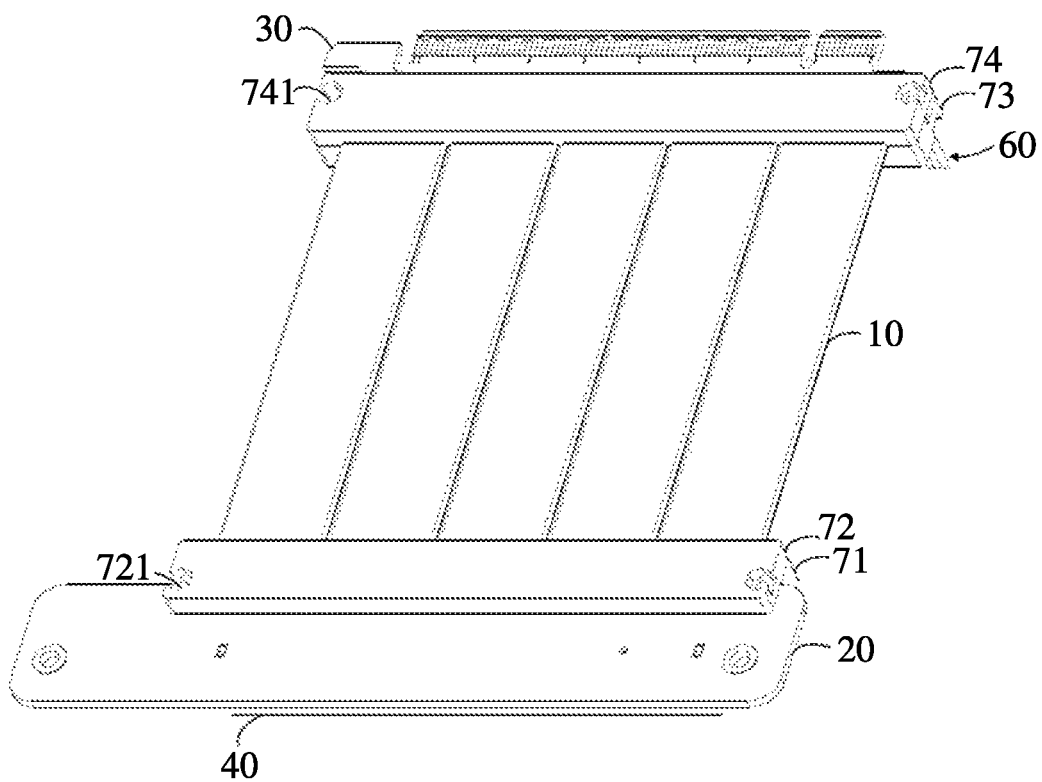
FIG. 25B shows the assembly of the light-emitting cable structure of FIG. 25A from the opposite perspective.

In this embodiment, the covering casing comprises a first casing member 71, a second casing member 72, a third casing member 73 and a fourth casing member 74. The first casing member 71 is arranged on one side of the first circuit board 20, the second casing member 72 is arranged on the other side of the first circuit board 20, the third casing member 73 is arranged on one side of the second circuit board 30, the fourth casing member 74 is arranged on the other side of the second circuit board 30. The first circuit board 20 further comprises a first joint hole 213, and the first casing member 71 further comprises a first hole 711 and a plurality of first concave parts 712. The second casing member 72 further comprises a second hole 721 and a plurality of first containing parts 722, and the first hole 711 and the second hole 721 are aligned with the first joint hole 213 on the first circuit board 20. The first concave parts 712 is arranged corresponding to the optical fibers 11, and the first containing parts 722 is arranged corresponding to the jacket 13. Lock-fixing elements (e.g. screws and screw caps) may be used to pass through the first hole 711, the second hole 721 and the first joint hole 213 on the first circuit board 20, so as to lock the first circuit board 20, the first casing member 71 and the second casing member 72. The second circuit board 30 further comprises a second joint hole 313, the third casing member 73 further comprises a third hole 731 and a plurality of second concave parts 732, and the fourth casing member 74 further comprises a fourth hole 741 and a plurality of second containing parts 742. The third hole 731 and the fourth hole 741 and the second circuit board 30 are aligned with the second joint hole 313. The second concave parts 732 are arranged corresponding to the optical fibers 11, and the second containing parts 742 may be arranged corresponding to the jacket 13. Lock-fixing elements (e.g. screws and screw caps) may be used to pass through the third hole 731, the fourth hole 741 and the second joint hole 313 on the second circuit board 30, in order to lock the second circuit board 30, the third casing member 73 and the fourth casing member 74. As shown in FIG. 25A and FIG. 25B, with the arrangement of the first casing member 71, the second casing member 72, the third casing member 73 and the fourth casing member 74, the first terminals 122, the second terminals 123, the first light-emitting element 51 and the second light-emitting element 61 arranged at both ends of the light-emitting cable 10 may be covered and protected, thus preventing the light-emitting cable structure from damages from the external environment.

The present disclosure has the following advantages: via arranging the signal groups 12 beneath the optical fibers 11 for a certain distance and arranging the signal groups outside the vertical projection of the optical fibers towards the signal groups, the light in the optical fibers is allowed to emit from the vertical projection. In this way, the user may observe the light transmitted in the optical fibers 11 from various angles of the light-emitting cable structure, thus greatly increasing the attractiveness of the product to consumers. Further, via the design of integrating the jacket 13 and the optical fibers 11, the process of assemble the light-emitting cable structure can be simplified. Via designing the jacket 13 to include the containment chambers 131, the user may select suitable optical fibers according to actual needs; or when the optical fibers are worn out due to the life expectancy is up, it only requires replacing new optical fibers to continue using the light-emitting cable structure, thus reducing the cost on the light-emitting cable structure for users. Via designing the jacket 13 to include the containment slots 132, the user may select suitable optical fibers according to actual needs, or when the optical fibers are worn out due to the life expectancy is up, it only requires replacing new optical fibers to continue using the light-emitting cable structure. Hence, the containment slots 132 can further facilitate the user to change optical fibers, thus improving the user experience. Moreover, via arranging the first light-emitting module 50 and the second light-emitting module 60 at both ends of the optical fibers 11 (i.e. The first terminal 122 and the second terminal 123), the optical fibers 11 may receive the light transmitted from said both end at the same time, thus increasing the brightness in the optical fibers 11, which further increases the attractiveness of the product to consumers.

One thing should be noted is that the abovementioned six embodiments are merely preferred combination of various elements of the present disclosure, and should not be interpreted as limitations of the present disclosure. In other words, other than the abovementioned six embodiments, there are actually more ways of combining the elements of the present disclosure.

It should be noted that among various combinations of each element in the present disclosure, the aforementioned six embodiments are merely preferable embodiments, and should not be interpreted as restrictions on the present disclosure. That is, more variations may be derived from each of the above embodiment, rather limiting the present disclosure to the above six embodiments only.

The above preferred embodiments are merely used to illustrate the present disclosure, and are not meant to limit the present invention. It can be realized that one skilled in the art may change or modify the present disclosure without departing from the spirit and scope of the present disclosure. Therefore, the claimed scope of the present disclosure should be based on what is defined in the following claims.

What is claimed is:

1. A light-emitting cable structure, comprising:
a light-emitting cable, comprising a plurality of optical fibers, a plurality of signal groups, a jacket, a plurality of first terminals and a plurality of second terminals, wherein the optical fibers are spaced from one another and are used to transmit light, the signal groups are arranged under the optical fibers for a certain distance, each of the signal groups comprises at least one signal cable for transmitting signals, the optical fibers is made of a lightguide material, the jacket is made of transparent material and is used to cover the optical fibers and the signal groups, each of the first terminals is arranged at one end of each of the at least one signal cable, each of the second terminals is arranged at the other end of each of the at least one signal cable, and each of the first terminals and each of the second terminals extend from each of the at least one signal cable;
a first circuit board, arranged at the light-emitting cable and electrically connected to the first terminals of the light-emitting cable;
at least one light-emitting module, arranged on the first circuit board and comprising a plurality of light-emitting elements arranged to emit light to one end of the optical fibers; and
a covering casing, arranged to cover the first terminals, the second terminals and the light-emitting elements;
wherein the signal groups are arranged outside a vertical projection of the optical fibers towards the signal groups, and light in the optical fibers is able to be emitted by the vertical projection,
wherein the jacket further comprises a plurality of containment chambers, the containment chambers are spaced from one another, and the optical fibers are arranged in the containment chambers in a one-to-one manner.

2. The light-emitting cable structure according to claim 1, wherein each of the signal groups further comprises a metal shielding layer covering the signal group, the metal shielding layer is used to avoid neighboring signal groups interfering each other when transmitting signals, and the metal shielding layer is an Aluminum foil.

3. The light-emitting cable structure according to claim 1, wherein the jacket has an integrated structure.

4. The light-emitting cable structure according to claim 1, further comprising a second circuit board, arranged at the other end of the light-emitting cable, and electrically connected to the second terminals on the light-emitting cable.

5. The light-emitting cable structure according to claim 4, wherein the first circuit board comprises a plurality of first external connection parts located on a first side and a plurality of first terminals welding parts located on a second side opposite to the first side, the first terminals are connected to the first terminals welding parts, the second circuit board comprises a plurality of second external connection parts located on the first side a plurality of second terminals welding parts located on the second side, and the second terminals are connected to the second terminals welding parts.

6. The light-emitting cable structure according to claim 5, further comprising a connector, wherein the connector comprises a plurality of first external connection welding pins, and the first external connection welding pins are connected to the first external connection parts on the first circuit board.

7. The light-emitting cable structure according to claim 5, wherein the first circuit board further comprises a plurality of light-emitting element welding parts located on the first side, each of the light-emitting element comprises a plurality of light-emitting element welding pins, and the light-emitting element welding pins are connected to the light-emitting element welding parts on the first circuit board.

8. The light-emitting cable structure according to claim 5, wherein the second circuit board further comprises plurality of light-emitting element welding parts located on the first side, each of the light-emitting elements comprises a plurality of light-emitting element welding pins, and the light-emitting element welding pins are connected to the light-emitting element welding parts on the second circuit board.

9. The light-emitting cable structure according to claim 4, wherein the covering casing comprises a first casing member, a second casing member, a third casing member and a fourth casing member, the first casing member is arranged at one side of the first circuit board, the second casing member is arranged on the other side of the first circuit board, the third casing member is arranged on one side of the second circuit board, the fourth casing member is arranged on the other side of the second circuit board, the first circuit board further comprises a first joint hole, the first casing member further comprises a first hole and a plurality of first concave parts, the second casing member further comprises a second hole and a plurality of first containing parts, the first hole and the second hole is aligned with the first joint hole, the first concave parts are arranged corresponding to the optical fibers, the first containing parts are arranged corresponding to the jacket, the second circuit board further comprises a second joint hole, the third casing member further comprises a third hole and a plurality of second concave parts, the fourth casing member further comprises a fourth hole and a plurality of second containing parts, the third hole and the fourth hole is aligned with the second joint hole, the second concave parts are arranged corresponding to the optical fibers, the second containing parts are arranged corresponding to the jacket, the first circuit board, the first casing member and the second casing member are lock-fixed via a lock-fixing element, and the second circuit board, the third casing member and the fourth casing member are lock-fixed via the lock-fixing element.

10. The light-emitting cable structure according to claim 4, wherein the first circuit board and the second circuit board are printed circuit boards (PCB).

11. The light-emitting cable structure according to claim 1, wherein the light-emitting module further comprises an external connection device, the external connection device comprises a plurality of light-emitting element welding parts and an external connection cable, each of the light-emitting elements comprises a plurality of light-emitting element welding pins, the light-emitting element welding pins of the light-emitting elements are connected to the light-emitting element welding parts of the external connection device, and the light-emitting elements emit light according to power control signals received via the external connection cable.

12. The light-emitting cable structure according to claim 11, further comprising at least one supporting plate, wherein the supporting plate is arranged at the light-emitting module and between circuit boards beneath the light-emitting module, and the supporting plate is used to make heights of the light-emitting elements match those of the optical fibers.

13. The light-emitting cable structure according to claim 11, further comprising at least one optical fiber positioning member, wherein the optical fiber positioning member is arranged at the first terminals or the second terminals, the optical fiber positioning member comprises a plurality of alignment apertures, the light-emitting cable further comprises a plurality of protruding optical fibers, each of the protruding optical fibers is arranged at one end of each of the optical fibers, each of the protruding optical fibers is extended from each of the optical fibers, and the protruding optical fibers are fastened to the alignment apertures.

14. The light-emitting cable structure according to claim 1, further comprising at least one optical fiber positioning member, wherein the optical fiber positioning member is arranged at the first terminals or the second terminals, the optical fiber positioning member comprises a plurality of alignment apertures, the light-emitting cable further comprises a plurality of protruding optical fibers, each of the protruding optical fibers is arranged at one end of each of the optical fibers, each of the protruding optical fibers is extended from each of the optical fibers, and the protruding optical fibers are fastened to the alignment apertures.

15. A light-emitting cable structure, comprising:
a light-emitting cable, comprising a plurality of optical fibers, a plurality of signal groups, a jacket, a plurality of first terminals and a plurality of second terminals, wherein the optical fibers are spaced from one another and are used to transmit light, the signal groups are arranged under the optical fibers for a certain distance, each of the signal groups comprises at least one signal cable for transmitting signals, the optical fibers is made of a lightguide material, the jacket is made of transparent material and is used to cover the optical fibers and the signal groups, each of the first terminals is arranged at one end of each of the at least one signal cable, each of the second terminals is arranged at the other end of each of the at least one signal cable, and each of the first terminals and each of the second terminals extend from each of the at least one signal cable;
a first circuit board, arranged at one end of the light-emitting cable and electrically connected to the first terminals of the light-emitting cable;
at least one light-emitting module, arranged on the first circuit board and comprising a plurality of light-emitting elements arranged to emit light to one end of the optical fibers; and
a covering casing, arranged to cover the first terminals, the second terminals and the light-emitting elements;
wherein the signal groups are arranged outside a vertical projection of the optical fibers towards the signal groups, and light in the optical fibers is able to be emitted by the vertical projection,
wherein the jacket further comprises a plurality of containment slots, the containment slots are spaced from one another, and the optical fibers are arranged in the containment slots in a one-to-one manner.

\* \* \* \* \*